US012087523B2

(12) United States Patent
Tesch et al.

(10) Patent No.: US 12,087,523 B2
(45) Date of Patent: Sep. 10, 2024

(54) SOLID DIELECTRIC INSULATED SWITCHGEAR

(71) Applicant: G & W ELECTRIC COMPANY, Bolingbrook, IL (US)

(72) Inventors: William Tesch, Montgomery, IL (US); Andres Laso, Chicago, IL (US); Nenad Uzelac, St. John, IN (US); Mattewos Tefferi, Naperville, IL (US)

(73) Assignee: G & W ELECTRIC COMPANY, Bolingbrook, IL (US)

( * ) Notice: Subject to any disclaimer, the term of this patent is extended or adjusted under 35 U.S.C. 154(b) by 357 days.

(21) Appl. No.: 17/543,363

(22) Filed: Dec. 6, 2021

(65) Prior Publication Data

US 2022/0181105 A1 Jun. 9, 2022

Related U.S. Application Data

(60) Provisional application No. 63/122,086, filed on Dec. 7, 2020.

(51) Int. Cl.
*H01H 33/12* (2006.01)
*H01H 33/66* (2006.01)
(Continued)

(52) U.S. Cl.
CPC ........ *H01H 33/125* (2013.01); *H01H 33/122* (2013.01); *H01H 33/6606* (2013.01); *H01H 33/6661* (2013.01); *H01H 2033/6623* (2013.01)

(58) Field of Classification Search
CPC .. H01H 33/125; H01H 33/122; H01H 33/128; H01H 33/022; H01H 33/24;
(Continued)

(56) References Cited

U.S. PATENT DOCUMENTS 2,367,937 A * 1/1945 Gates ................... H01H 33/122
200/6 R
3,247,824 A 4/1966 Arthur
(Continued)

FOREIGN PATENT DOCUMENTS

CA        934412 A    9/1973
CA      1283941 C    5/1991
(Continued)

OTHER PUBLICATIONS

Eaton.com. Eaton acquires Innovative Switchgear Solutions. <https://www.eaton.com/us/en-us/company/news-insights/news-releases/2019/eaton-acquires-innovative-switchgear-solutions.html%20%20%20Use%20%2522Eaton%20acquires%20Innovative%20Switchgear%20Solutions%27%20as%20text%20for%20link.html> Jul. 18, 2019. (1 page).

(Continued)

*Primary Examiner* — William A Bolton
(74) *Attorney, Agent, or Firm* — Michael Best & Friedrich LLP

(57) ABSTRACT

A switchgear system operable at voltages up to 27 kV includes an enclosure containing atmospheric air and a loadbreak module disposed within the enclosure. The loadbreak module includes a loadbreak module housing made of a solid dielectric material, a vacuum interrupter enclosed within the loadbreak module housing and having a fixed contact and a movable contact, and an interchange electrically connected to the movable contact. The vacuum interrupter is operable to selectively break or establish an electrical pathway between the interchange and a terminal in response to movement of the movable contact relative to the fixed contact. The switchgear system further includes a bushing coupled to the enclosure and a disconnect switch electrically connected in series between the loadbreak module and the bushing. The disconnect switch includes a (Continued)

disconnect switch housing made of a solid dielectric material.

20 Claims, 17 Drawing Sheets

(51) Int. Cl.
  *H01H 33/662* (2006.01)
  *H01H 33/666* (2006.01)
(58) Field of Classification Search
  CPC ........ H01H 33/6606; H01H 33/6661; H01H 33/66207; H01H 2033/6623; H02B 13/02; H02B 13/035
  USPC ........ 218/118, 121, 123, 126, 134, 138–140, 218/155; 439/186
  See application file for complete search history.

(56) References Cited

U.S. PATENT DOCUMENTS

| | | | |
|---|---|---|---|
| 3,509,518 A | 4/1970 | Phillips |
| 3,621,170 A | 11/1971 | Jensen |
| 3,632,933 A | 1/1972 | Mcclain et al. |
| 3,829,642 A | 8/1974 | Graybill |
| 3,835,439 A | 9/1974 | Yonkers |
| 3,915,534 A | 10/1975 | Yonkers |
| 3,932,720 A | 1/1976 | Gaigg et al. |
| 3,949,343 A | 4/1976 | Yonkers |
| 4,029,380 A | 6/1977 | Yonkers |
| 4,105,878 A | 8/1978 | Date et al. |
| 4,203,641 A | 5/1980 | Siebens |
| 4,216,359 A | 8/1980 | Hruda |
| 4,568,804 A | 2/1986 | Luehring |
| 4,591,678 A * | 5/1986 | Yin .................... H01H 33/128 218/121 |
| 4,764,123 A | 8/1988 | Shaw et al. |
| 4,767,894 A | 8/1988 | Schombourg |
| 4,773,872 A | 9/1988 | Borgstrom et al. |
| 4,863,392 A | 9/1989 | Borgstrom et al. |
| 4,865,559 A | 9/1989 | Clabburn |
| 4,879,441 A * | 11/1989 | Hamm ................. H01H 33/022 218/119 |
| 4,888,458 A | 12/1989 | Suzuyama et al. |
| 5,059,753 A | 10/1991 | Hamm |
| 5,393,240 A | 2/1995 | Makal et al. |
| 5,427,538 A | 6/1995 | Knapp et al. |
| 5,436,414 A | 7/1995 | Hodkin et al. |
| 5,521,567 A | 5/1996 | Devonald, III et al. |
| 5,846,093 A | 12/1998 | Muench, Jr. et al. |
| 6,042,407 A | 3/2000 | Scull et al. |
| 6,127,637 A | 10/2000 | Estey et al. |
| 6,156,989 A | 12/2000 | Miller et al. |
| 6,227,908 B1 | 5/2001 | Aumeier et al. |
| 6,296,497 B1 | 10/2001 | Xu |
| 6,362,445 B1 | 3/2002 | Marchand et al. |
| 6,364,216 B1 | 4/2002 | Martin |
| 6,373,015 B1 | 4/2002 | Marchand et al. |
| 6,419,512 B2 | 7/2002 | Starck |
| 6,520,795 B1 | 2/2003 | Jazowski |
| 6,531,841 B1 | 3/2003 | Elli et al. |
| 6,573,468 B2 | 6/2003 | Sfondrini et al. |
| 6,930,271 B1 | 8/2005 | Palmieri et al. |
| 7,134,889 B2 | 11/2006 | Hughes et al. |
| 7,186,937 B1 | 3/2007 | Ricciuti et al. |
| 7,278,889 B2 | 10/2007 | Muench et al. |
| 7,319,203 B1 | 1/2008 | Briggs et al. |
| 7,341,468 B2 | 3/2008 | Hughes et al. |
| 7,384,287 B2 | 6/2008 | Hughes et al. |
| 7,598,468 B2 | 10/2009 | Chen et al. |
| 7,632,120 B2 | 12/2009 | Hughes et al. |
| 7,666,012 B2 | 2/2010 | Hughes et al. |
| 7,696,447 B2 | 4/2010 | Chen et al. |
| 7,731,514 B2 | 6/2010 | Hughes et al. |
| 7,796,374 B2 | 9/2010 | Mori et al. |
| 7,811,109 B2 | 10/2010 | Hughes et al. |
| 7,811,113 B2 | 10/2010 | Hughes |
| 7,819,133 B2 | 10/2010 | Minervini et al. |
| 7,820,926 B2 | 10/2010 | Kowalyshen et al. |
| 7,862,354 B2 | 1/2011 | Hughes et al. |
| 7,905,735 B2 | 3/2011 | Hughes |
| 7,950,939 B2 | 5/2011 | Hughes et al. |
| 8,328,569 B2 | 12/2012 | Roscizewski et al. |
| 8,338,727 B2 | 12/2012 | Wolfe |
| 8,658,931 B2 | 2/2014 | Heller et al. |
| 8,664,556 B2 | 3/2014 | Yamamoto et al. |
| 8,729,416 B2 * | 5/2014 | Bullock ............. H01H 33/6662 218/118 |
| 8,916,786 B2 | 12/2014 | Gemme et al. |
| D722,030 S | 2/2015 | Opfer et al. |
| 8,973,519 B2 | 3/2015 | Bindics et al. |
| 8,975,550 B2 * | 3/2015 | Sugai ................. H01H 33/6661 218/4 |
| 8,987,618 B2 | 3/2015 | Thompson |
| 9,070,517 B2 | 6/2015 | Bullock et al. |
| 9,106,571 B2 | 8/2015 | Johnson |
| 9,112,322 B2 | 8/2015 | Siebens |
| 9,136,077 B2 | 9/2015 | Hu et al. |
| 9,153,390 B2 | 10/2015 | Lammers et al. |
| 9,177,730 B2 | 11/2015 | Binnendijk et al. |
| 9,362,663 B2 | 6/2016 | Maroney et al. |
| 9,373,456 B2 | 6/2016 | Yang et al. |
| 9,385,493 B2 | 7/2016 | Maroney |
| 9,443,668 B2 | 9/2016 | Zhang et al. |
| 9,461,387 B2 | 10/2016 | Heilersig et al. |
| 9,472,359 B2 | 10/2016 | Ding et al. |
| D772,185 S | 11/2016 | Moninski |
| 9,530,578 B2 | 12/2016 | Chen et al. |
| 9,552,947 B2 | 1/2017 | Heller et al. |
| D778,145 S | 2/2017 | Smith |
| 9,576,757 B2 | 2/2017 | Opfer |
| 9,583,897 B2 | 2/2017 | Fargo |
| 9,601,856 B2 | 3/2017 | Regantini et al. |
| 9,640,953 B2 | 5/2017 | Beyginian et al. |
| 9,660,402 B2 | 5/2017 | Maroney |
| 9,679,708 B2 | 6/2017 | Benson, IV et al. |
| 9,685,280 B2 | 6/2017 | Benson et al. |
| D796,941 S | 9/2017 | Smith |
| 9,865,405 B2 | 1/2018 | Rajauria et al. |
| 9,871,354 B2 | 1/2018 | Moninski |
| 9,880,724 B2 | 1/2018 | Chen et al. |
| 9,906,008 B2 | 2/2018 | Yoshida et al. |
| 10,020,145 B2 | 7/2018 | Geusendam et al. |
| 10,045,396 B2 | 8/2018 | Wilden et al. |
| 10,099,899 B2 | 10/2018 | Smith |
| 10,247,767 B2 | 4/2019 | Ennis et al. |
| 10,276,318 B1 | 4/2019 | Schafer |
| 10,290,436 B2 | 5/2019 | Schafer |
| 10,290,437 B1 | 5/2019 | Schafer |
| 10,310,461 B2 | 6/2019 | Berkowitz et al. |
| 10,312,822 B2 | 6/2019 | Porter |
| 10,319,358 B2 | 6/2019 | Im et al. |
| 10,319,538 B1 | 6/2019 | Schafer |
| 10,320,193 B2 | 6/2019 | Porter |
| 10,410,812 B2 | 9/2019 | Zhu et al. |
| 10,418,804 B2 | 9/2019 | Staszesky et al. |
| 10,431,983 B2 | 10/2019 | Wang et al. |
| 10,439,511 B2 | 10/2019 | Wang et al. |
| D865,686 S | 11/2019 | Wallace et al. |
| 10,468,886 B2 | 11/2019 | Porter |
| 10,504,678 B2 | 12/2019 | Smith et al. |
| 10,535,993 B2 | 1/2020 | Pabst et al. |
| 10,581,235 B2 | 3/2020 | Seuss et al. |
| 10,587,109 B1 | 3/2020 | Maroney et al. |
| 10,593,497 B2 | 3/2020 | Pabst et al. |
| 10,600,593 B2 | 3/2020 | Falkingham |
| 10,608,393 B2 | 3/2020 | Mcdearmon et al. |
| 10,614,531 B2 | 4/2020 | Ozer |
| 10,643,808 B2 | 5/2020 | Falkingham |
| 10,658,132 B2 | 5/2020 | Bianco et al. |
| 10,727,662 B2 | 7/2020 | Smith et al. |
| 10,734,810 B2 | 8/2020 | Matamoros |
| 10,784,064 B2 | 9/2020 | Kowalyshen et al. |

(56) References Cited

U.S. PATENT DOCUMENTS

| | | |
|---|---|---|
| 10,784,677 B2 | 9/2020 | Porter |
| 10,784,812 B2 | 9/2020 | Berkowitz et al. |
| 10,818,455 B2 | 10/2020 | Djogo |
| 10,818,460 B2 | 10/2020 | Djogo et al. |
| 10,819,098 B2 | 10/2020 | Porter |
| 10,826,287 B2 | 11/2020 | Sharon |
| 2004/0227598 A1 | 11/2004 | Ciarcia et al. |
| 2006/0124600 A1 | 6/2006 | Harada et al. |
| 2008/0220638 A1 | 9/2008 | Hughes et al. |
| 2010/0243611 A1 | 9/2010 | Takahashi et al. |
| 2010/0326960 A1 | 12/2010 | Heller et al. |
| 2013/0213938 A1 | 8/2013 | Bramhapurikar et al. |
| 2013/0248338 A1* | 9/2013 | Belloni .............. H01H 9/02 200/5 A |
| 2015/0001053 A1 | 1/2015 | Miyamoto et al. |
| 2015/0142197 A1 | 5/2015 | Massie et al. |
| 2015/0292242 A1 | 10/2015 | Moninski |
| 2015/0294827 A1 | 10/2015 | Lettow et al. |
| 2015/0332880 A1 | 11/2015 | Falkingham |
| 2016/0118795 A1 | 4/2016 | Berkowitz et al. |
| 2016/0254666 A1 | 9/2016 | Curtiss et al. |
| 2017/0214250 A1 | 7/2017 | Zietlow et al. |
| 2017/0345606 A1 | 11/2017 | Smith et al. |
| 2018/0076599 A1* | 3/2018 | Faulkner .............. B29C 70/72 |
| 2018/0358839 A1 | 12/2018 | Perez et al. |
| 2018/0366925 A1* | 12/2018 | Beaver .............. H02B 13/005 |
| 2019/0096573 A1 | 3/2019 | Porter et al. |
| 2019/0181647 A1 | 6/2019 | Biallas et al. |
| 2019/0237968 A1 | 8/2019 | Higginson et al. |
| 2019/0245343 A1 | 8/2019 | Porter et al. |
| 2019/0252139 A1 | 8/2019 | Falkingham |
| 2019/0386470 A1 | 12/2019 | Cortinovis et al. |
| 2020/0072894 A1 | 3/2020 | Montenegro et al. |
| 2020/0075235 A1 | 3/2020 | Montenegro et al. |
| 2020/0075282 A1 | 3/2020 | Lettow et al. |
| 2020/0076183 A1 | 3/2020 | Montenegro et al. |
| 2020/0076208 A1 | 3/2020 | Williams et al. |
| 2020/0099217 A1 | 3/2020 | Meisinger et al. |
| 2020/0119546 A1 | 4/2020 | Quinlan |
| 2020/0124642 A1 | 4/2020 | Djogo |
| 2020/0144845 A1 | 5/2020 | Facchini et al. |
| 2020/0191832 A1 | 6/2020 | Djogo |
| 2020/0191841 A1 | 6/2020 | Lakirovich et al. |
| 2020/0191855 A1 | 6/2020 | Djogo et al. |
| 2020/0194200 A1 | 6/2020 | Bishop et al. |
| 2020/0251294 A1 | 8/2020 | Rusev et al. |
| 2020/0251895 A1 | 8/2020 | Tobin |
| 2020/0258703 A1 | 8/2020 | Desmond et al. |
| 2020/0259320 A1 | 8/2020 | Guo et al. |
| 2020/0259332 A1 | 8/2020 | Bishop et al. |
| 2020/0266620 A1 | 8/2020 | Smith et al. |
| 2020/0287384 A1 | 9/2020 | Quinlan |
| 2020/0309827 A1 | 10/2020 | Sharon et al. |
| 2020/0309841 A1 | 10/2020 | Sharon |
| 2020/0333385 A1 | 10/2020 | Wang et al. |
| 2020/0335293 A1 | 10/2020 | Goldman et al. |

FOREIGN PATENT DOCUMENTS

| | | |
|---|---|---|
| CA | 1320522 C | 7/1993 |
| CA | 2329852 A1 | 6/2001 |
| CA | 2146041 C | 8/2005 |
| CA | 2641000 C | 5/2010 |
| CA | 2534929 C | 4/2015 |
| CA | 2534937 C | 4/2015 |
| CA | 2626167 C | 5/2015 |
| CA | 2796580 C | 6/2015 |
| CA | 2630689 C | 10/2015 |
| CA | 2385432 C | 12/2015 |
| CA | 2704338 C | 2/2016 |
| CA | 2825731 C | 8/2016 |
| CA | 2893589 C | 12/2017 |
| CA | 3040399 A1 | 4/2018 |
| CA | 3036612 A1 | 10/2019 |
| CA | 3051435 A1 | 2/2020 |
| CA | 3051436 A1 | 2/2020 |
| CA | 3054142 A1 | 4/2020 |
| CA | 3060552 A1 | 5/2020 |
| CA | B062681 A1 | 6/2020 |
| CA | 3068230 A1 | 8/2020 |
| CA | 3068231 A1 | 8/2020 |
| CN | 1047695 C | 12/1999 |
| DE | 3211119 C2 | 1/1985 |
| DE | 3508329 A1 | 9/1986 |
| DE | 9319264 U1 | 2/1994 |
| DE | 4210773 C2 | 11/1995 |
| DE | 29501824 U1 | 3/1996 |
| DE | 19502062 A1 | 7/1996 |
| DE | 10128422 C1 | 6/2002 |
| EP | 0563535 B1 | 9/1996 |
| GB | 756074 A | 8/1956 |
| JP | 2000270429 A | 9/2000 |
| WO | 2004059796 A1 | 7/2004 |
| WO | 2006074138 A1 | 7/2006 |
| WO | 2007016293 A1 | 2/2007 |
| WO | 2007019459 A1 | 2/2007 |
| WO | 2008103256 A1 | 8/2008 |
| WO | 2008116090 A2 | 9/2008 |
| WO | 2009108480 A1 | 9/2009 |
| WO | 2009114384 A2 | 9/2009 |
| WO | 2011061579 A1 | 5/2011 |
| WO | 2011107254 A1 | 9/2011 |
| WO | 2011107255 A1 | 9/2011 |
| WO | 2011146822 A1 | 11/2011 |
| WO | 2012004148 A1 | 1/2012 |
| WO | 2013156629 A1 | 10/2013 |
| WO | 2015014812 A1 | 2/2015 |
| WO | 2015076029 A1 | 5/2015 |
| WO | 2016091753 A1 | 6/2016 |
| WO | 2017004109 A1 | 1/2017 |
| WO | 2017106670 A1 | 6/2017 |
| WO | 2017106719 A1 | 6/2017 |
| WO | 2017106725 A1 | 6/2017 |
| WO | 2017132113 A1 | 8/2017 |
| WO | 2018231673 A1 | 12/2018 |
| WO | 2019060104 A1 | 3/2019 |
| WO | 2019147358 A1 | 8/2019 |
| WO | 2019152107 A1 | 8/2019 |
| WO | 2019153018 A1 | 8/2019 |
| WO | 2019164572 A1 | 8/2019 |
| WO | 2019168586 A1 | 9/2019 |
| WO | 2020047343 A1 | 3/2020 |
| WO | 2020068479 A1 | 4/2020 |
| WO | 2020076531 A1 | 4/2020 |
| WO | 2020096811 A1 | 5/2020 |
| WO | 2020131908 A1 | 6/2020 |
| WO | 2020159715 A1 | 8/2020 |
| WO | 2020159716 A1 | 8/2020 |
| WO | 2020163144 A1 | 8/2020 |
| WO | 2020167718 A1 | 8/2020 |
| WO | 2020198141 A1 | 10/2020 |
| WO | 2020198142 A1 | 10/2020 |
| WO | 2020214591 A1 | 10/2020 |

OTHER PUBLICATIONS

G&W. Vantage Style SF6 Switches. Catalog Vantage08. Dec. 2008 (12 pages).

S&C Electric Company. S&C Vista® SD Underground Distribution Switchgear. Photo Sheet 695-700. Nov. 21, 2016 (3 pages).

S&C Electric Company. S&C Vista® SD Underground Distribution Switchgear. Photo Sheet 695-701. Nov. 21, 2016 (3 pages).

Upstate Colorado Economic Development. Innovative Switchgear Solutions Inc Spotlight. Available at least as early as Nov. 9, 2020 (1 page).

* cited by examiner

SOLID DIELECTRIC INSULATED SWITCHGEAR

CROSS-REFERENCE TO RELATED APPLICATIONS

This application claims priority to and the benefit of U.S. Provisional Application No. 63/122,086, filed Dec. 7, 2020, the entire content of which is incorporated herein by reference.

FIELD OF THE INVENTION

The present invention relates to electrical switchgear, and more particularly solid-dielectric insulated switchgear.

BACKGROUND

Medium voltage electrical switchgear used in power distribution systems is typically contained within a gas-tight enclosure filled with an insulating gas, such as sulfur hexafluoride ("SF6"). SF6 provides greater electrical insulation capability than air, allowing SF6-insulated switchgear to be contained within a relatively compact enclosure.

SF6 is a very potent greenhouse gas. As a result, enclosures containing SF6 must be carefully designed to avoid leakage. In addition, use of SF6 may be limited by regulations aimed to reduce emissions of greenhouse gases. Accordingly, a need exists for switchgear that can be accommodated within a relatively compact enclosure without requiring SF6 gas insulation.

SUMMARY

The disclosure provides, in one aspect, a switchgear system operable at voltages up to 27 kV. The switchgear system includes an enclosure containing atmospheric air and a loadbreak module disposed within the enclosure. The loadbreak module includes a loadbreak module housing made of a solid dielectric material, a vacuum interrupter enclosed within the loadbreak module housing and having a fixed contact and a movable contact, an interchange electrically connected to the movable contact, wherein the movable contact is movable along a first axis, a first terminal electrically connected to the interchange, a second terminal electrically connected to the interchange, wherein the second terminal is coaxial with the first terminal along a second axis that is perpendicular to the first axis, and wherein the first terminal and the second terminal are disposed on opposite sides of the interchange, and a third terminal electrically connected to the fixed contact. The vacuum interrupter is operable to selectively break or establish an electrical pathway between the interchange and the third terminal in response to movement of the movable contact relative to the fixed contact. The switchgear system further includes a bushing coupled to the enclosure. The bushing includes a fourth terminal accessible from outside the enclosure. The switchgear system also includes a disconnect switch electrically connected in series between the loadbreak module and the bushing. The disconnect switch includes a disconnect switch housing made of a solid dielectric material, a blade rotatably coupled to the housing, a first contact electrically connected to the fourth terminal, and a second contact electrically connected to the third terminal. The blade is rotatable relative to the housing between a first position in which the blade is spaced from the first contact and the second contact such that the third terminal is electrically disconnected from the fourth terminal, and a second position in which the blade engages the first contact and the second contact to establish an electrical connection between the third terminal and the fourth terminal.

The present disclosure provides, in another aspect, a switchgear system operable at voltages up to 27 kV and including an enclosure containing atmospheric air and a loadbreak module disposed within the enclosure. The loadbreak module includes a loadbreak module housing made of a solid dielectric material, a vacuum interrupter enclosed within the loadbreak module housing and having a fixed contact and a movable contact, an interchange electrically connected to the movable contact, a first terminal electrically connected to the interchange, a second terminal electrically connected to the interchange, and a third terminal electrically connected to the fixed contact. The vacuum interrupter is operable to selectively break or establish an electrical pathway between the interchange and the third terminal in response to movement of the movable contact relative to the fixed contact. The switchgear system further includes a bushing configured to be coupled to the enclosure, the bushing including a fourth terminal accessible from outside the enclosure, and a disconnect switch configured to be electrically connected in series between the loadbreak module and the bushing. The disconnect switch includes a disconnect switch housing made of a solid dielectric material, a blade rotatably coupled to the housing, a first contact configured to be electrically connected to the fourth terminal, and a second contact configured to be electrically connected to the third terminal. The blade is rotatable relative to the housing between a first position in which the blade is spaced from the first contact and the second contact such that the third terminal is electrically disconnected from the fourth terminal, and a second position in which the blade engages the first contact and the second contact to establish an electrical connection between the third terminal and the fourth terminal. The bushing is configured to be selectively coupled to (i) the disconnect switch to electrically connect the fourth terminal to the first contact and (ii) the loadbreak module housing to electrically connect the fourth terminal to the third terminal.

The present disclosure provides, in another aspect, a switchgear system operable at voltages up to 27 kV and including an enclosure containing atmospheric air and a plurality of identical switch assemblies disposed within the enclosure. The plurality of switch assemblies is arranged in a plurality of rows. Each switch assembly is electrically connected to at least one other switch assembly of the plurality of switch assemblies. Each switch assembly of the plurality of switch assemblies includes a loadbreak module including a loadbreak module housing made of a solid dielectric material, a vacuum interrupter enclosed within the loadbreak module housing and having a fixed contact and a movable contact, an interchange electrically connected to the movable contact, a first terminal electrically connected to the interchange, a first opening aligned with the first terminal, a second terminal electrically connected to the interchange, a second opening aligned with the second terminal, and a third terminal electrically connected to the fixed contact. The vacuum interrupter is operable to selectively break or establish an electrical pathway between the interchange and the third terminal in response to movement of the movable contact relative to the fixed contact. The switchgear system further includes a bushing configured to be coupled to the enclosure. The bushing includes a fourth terminal accessible from outside the enclosure. The bushing is configured to be coupled to the loadbreak module housing to electrically connect the fourth terminal to the third terminal. The switchgear assembly further includes a plurality of bridge assemblies, each bridge assembly configured to electrically connect the first terminal or the second terminal of each switch assembly to a first terminal or a second terminal of another switch assembly of the plurality of switch assemblies. Each bridge assembly of the plurality of bridge assemblies is configured to be selectively received in the first opening or the second opening of each switch assembly of the plurality of switch assemblies.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Also, it is to be understood that the phraseology and terminology used herein is for the purpose of description and should not be regarded as limiting. For example, the use of directional terms such as upper, lower, top, bottom, left, and right are used for descriptive purposes only with reference to the particular orientations illustrated in the figures.

DETAILED DESCRIPTION

FIGS. 1-5 illustrate a switchgear system 10 according to an embodiment of the present disclosure. The switchgear system 10 is a medium-voltage switchgear system for electrical power distribution/segmentation at maximum voltages up to 15.5 kilovolts ("kV"), 15 kV, 27 kV, or 38 kV and continuous currents of up to 200 Amps ("A"), 300 A, 400 A, 500 A, 600 A, or 630 A in certain embodiments. For example, in the illustrated embodiment, the switchgear system 10 is configured to operate at a maximum voltage of 27 kV and a maximum continuous current of 630 A. As described in greater detail below, the switchgear system 10 includes components with high performance solid-dielectric insulation, allowing the components to be contained within a compact enclosure exposed to atmospheric air (i.e. without requiring any insulating gas, such as SF6).

Figure 1:
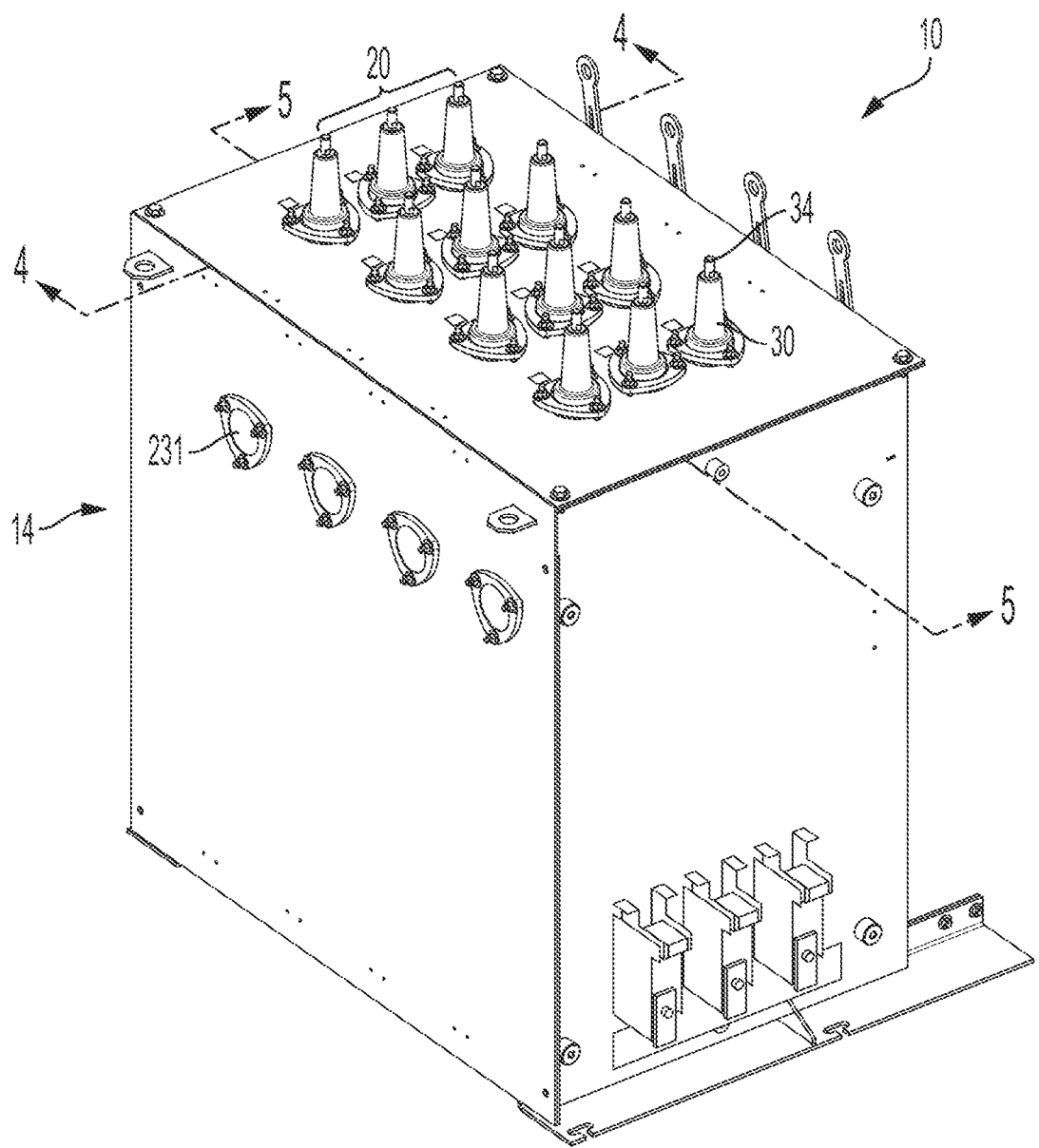
FIG. 1 is a perspective view of a switchgear system according to an embodiment of the present disclosure.
Figure 2:
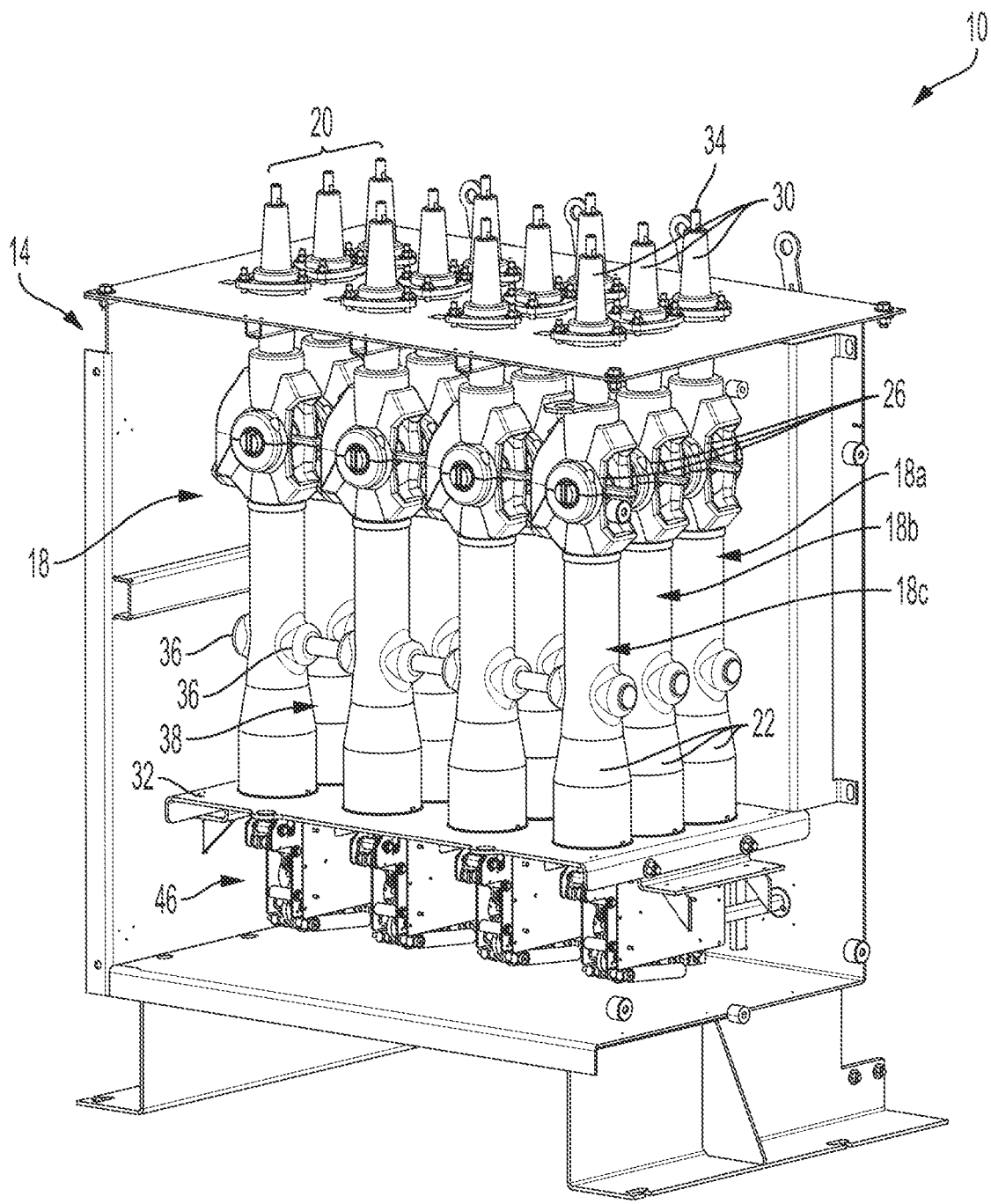
FIG. 2 is a perspective view of the switchgear system of FIG. 1, with a portion of an enclosure of the switchgear system hidden.

The switchgear system 10 includes an enclosure 14, which is preferably made of metal such as mild steel or stainless steel. Referring to FIG. 2, a plurality of switch assemblies 18 is at least partially disposed within the enclosure 14. In the illustrated embodiment, the switchgear system 10 is configured as a 3-phase, multi-way switchgear system 10. As such, the illustrated switchgear system 10 includes multiple "ways" or rows 20, each containing three switch assemblies 18a, 18b, 18c. Each switch assembly 18a, 18b, 18c corresponds to a different phase of a three-phase power distribution system. The illustrated switchgear system 10 includes four rows 20 of three switch assemblies 18a, 18b, 18c, such that the illustrated switchgear system 10 is a four-way switchgear system 10 with twelve total switch assemblies 18. In other embodiments, the switchgear system 10 may be configured as a single-way system, a two-way system, a three-way system, a five-way system, or a system with any other desired number of ways. In yet other embodiments, the switchgear system 10 may be configured as a single-phase switchgear system with one or more ways each containing only a single switch assembly 18.

Figure 14:
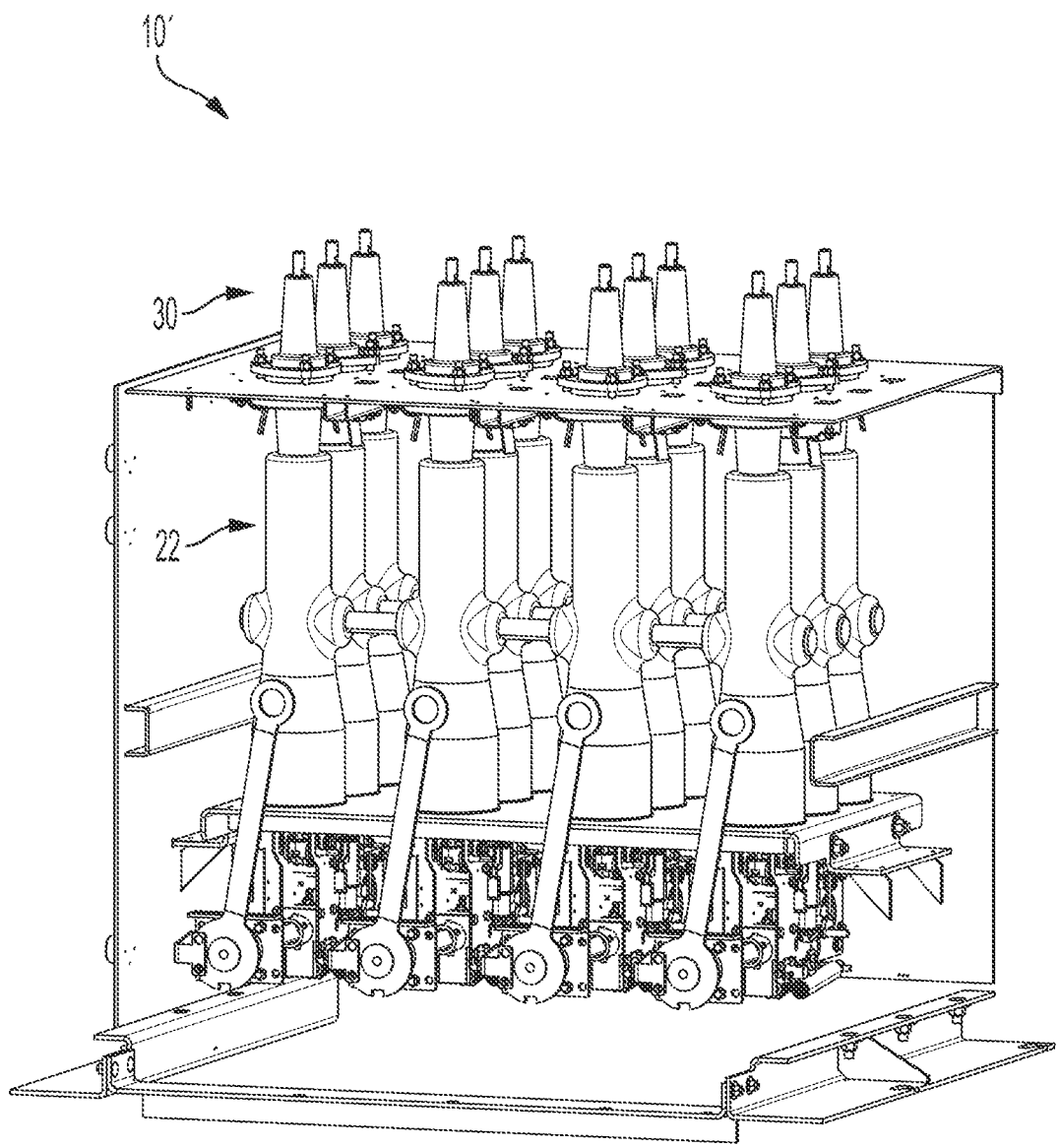
FIG. 14 is a perspective view of a switchgear system according to another embodiment of the present disclosure, with a portion of an enclosure of the switchgear system hidden, the switchgear system including a plurality of switch assemblies, each having a bushing connected to a loadbreak module without a disconnect switch between the bushing and the loadbreak module.

With continued reference FIG. 2, each switch assembly 18 in the illustrated embodiment includes a loadbreak module 22, a disconnect switch 26, and a bushing 30. The disconnect switch 26 is coupled in series between the loadbreak module 22 and the bushing 30. In other embodiments (e.g., FIGS. 14-15), the disconnect switch 26 may be omitted, such that the loadbreak module 22 is coupled directly to the bushing 30. In the illustrated embodiment, the loadbreak modules 22 are supported on a shelf 32 within the enclosure 14.

Each bushing 30 includes a load terminal 34 (e.g., a conductive lug) disposed outside of the enclosure 14, providing an attachment point for an electrical cable (not shown) of a load circuit. The illustrated loadbreak modules 22 each include a pair of line terminals 36, at least one of which is connected to a loadbreak module 22 of the same phase in an adjacent way 20. The interconnected line terminals 36 form a line bus 38. The line bus 38 is electrically connected to a line power source in any suitable manner (e.g., by connecting one of the line terminals 36 to the line power source). As described in greater detail below, each switch assembly 18 is operable to selectively establish or break an electrical pathway between the associated line bus 38 and the bushing 30, thereby establishing or breaking an electrical circuit between the line power source and the load circuit.

Figure 3:
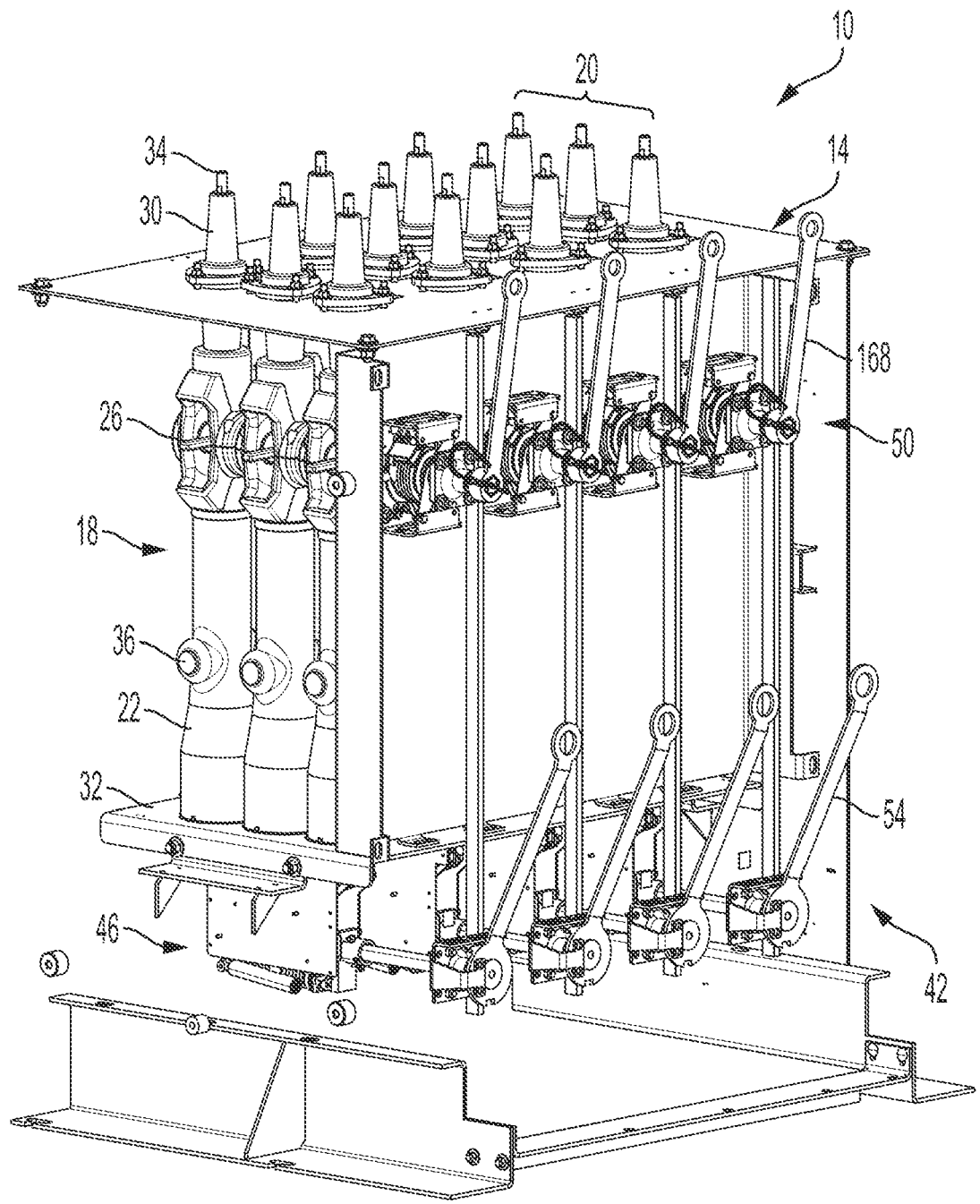
FIG. 3 is another perspective view of the switchgear system of FIG. 1, with a portion of the enclosure hidden.

With reference to FIG. 3, the switchgear system 10 further includes a drive assembly 42 supported by the enclosure 14. The drive assembly 42 includes a plurality of loadbreak actuator mechanisms 46 for actuating the loadbreak modules 22 and a plurality of disconnect actuator mechanisms 50 for actuating the disconnect switches 26. In the illustrated embodiment, the drive assembly 42 includes one loadbreak actuator mechanism 46 for each way 20 of the switchgear system 10, such that the three phases in a given way 20 are actuated together.

Figure 4:
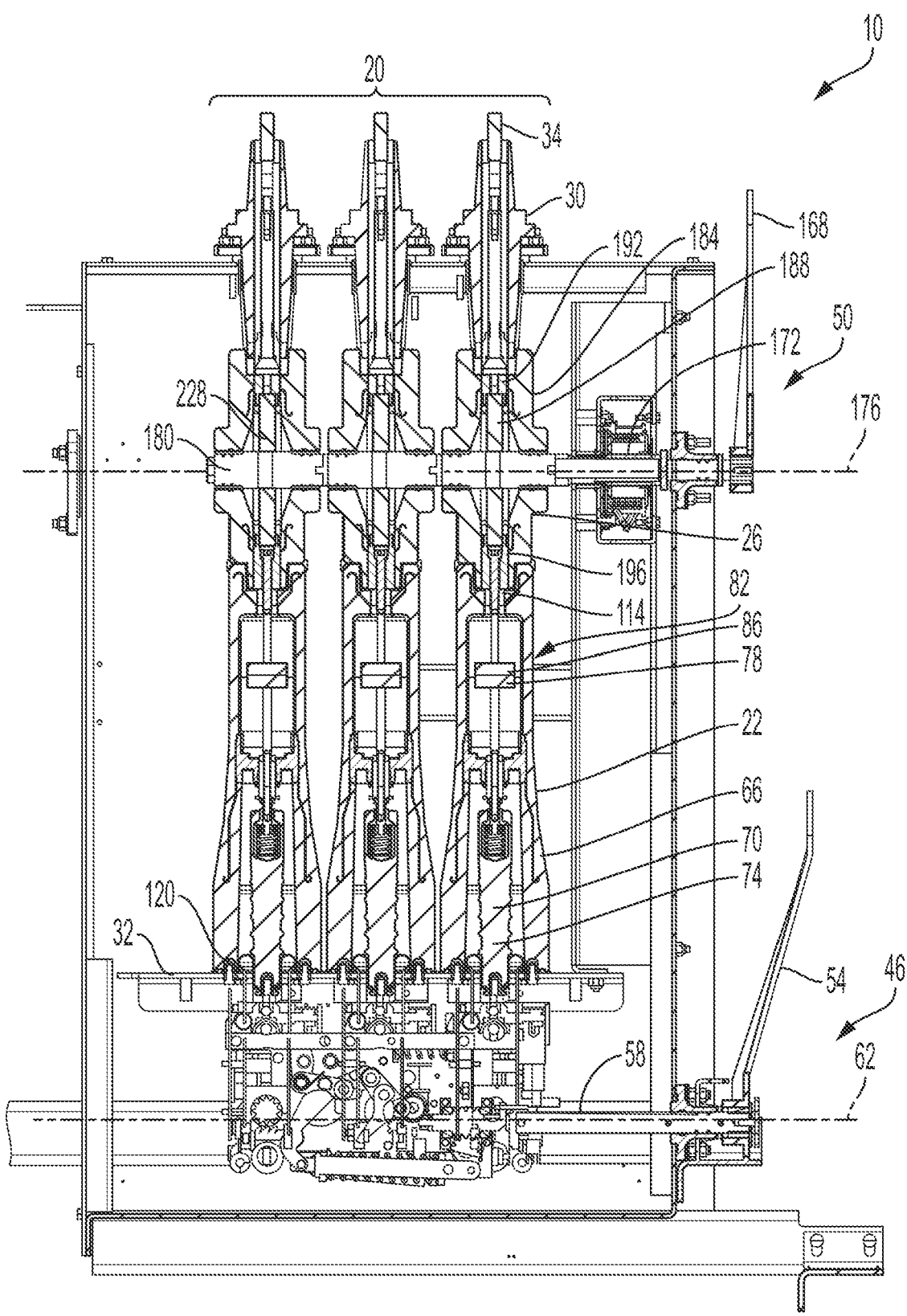
FIG. 4 is a cross-sectional view of the switchgear system of FIG. 1, taken along line 4-4 in FIG. 1, with a plurality of switch assemblies of the switchgear system illustrated in a closed position.

Referring to FIG. 4, each loadbreak actuator mechanism 46 includes a handle 54 to operate the loadbreak actuator mechanism 46. The handle 54 is preferably accessible from outside the enclosure 14 to permit a user to manually operate the loadbreak actuator mechanism 46. The handle 54 is coupled for co-rotation with a first actuator shaft 58 that extends into the enclosure 14 along a first longitudinal axis 62. In other embodiments, the loadbreak actuator mechanism 46 may additionally or alternatively be configured for automatic and/or remote operation to provide a loadbreak and/or fault interruption function.

Each of the loadbreak modules 22 in the illustrated embodiment includes a housing 66 and a drive shaft 70 that extends from the housing 66 along a second longitudinal axis 74, which may be perpendicular to the first longitudinal axis 62 (of the first actuator shaft 58). The drive shaft 70 is operatively coupled to a movable contact 78 of a vacuum interrupter 82, such that movement of the drive shaft 70 along its axis 74 causes movement of the movable contact 78 relative to a fixed contact 86 of the vacuum interrupter 82. The loadbreak actuator mechanism 46 is configured such that rotation of the handle 54 and the shaft 58 about the first longitudinal axis 62 causes the drive shafts 70 of each of the three loadbreak modules 22 in the way 20 to translate along their respective axes 74, thereby breaking or re-establishing an electrical connection between the movable contacts 78 and the fixed contacts 86. For example, rotation of the handle 54 and the shaft 58 in a first direction results in separation of the contacts 78, 86, and rotation of the handle 54 and the shaft 58 in a second direction opposite the first direction moves the movable contacts 78 back toward the fixed contacts 86.

Figure 7:
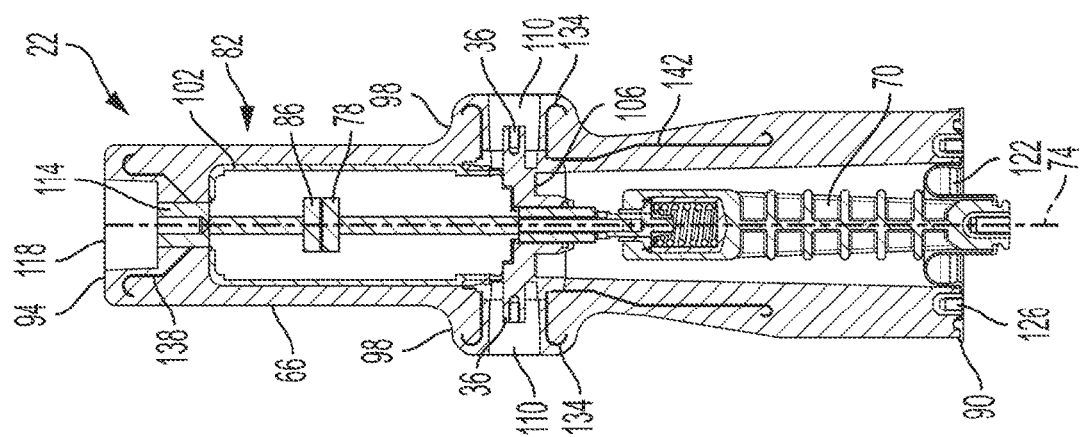
FIG. 7 is a cross-sectional view of the loadbreak module of FIG. 6.
Figure 6:
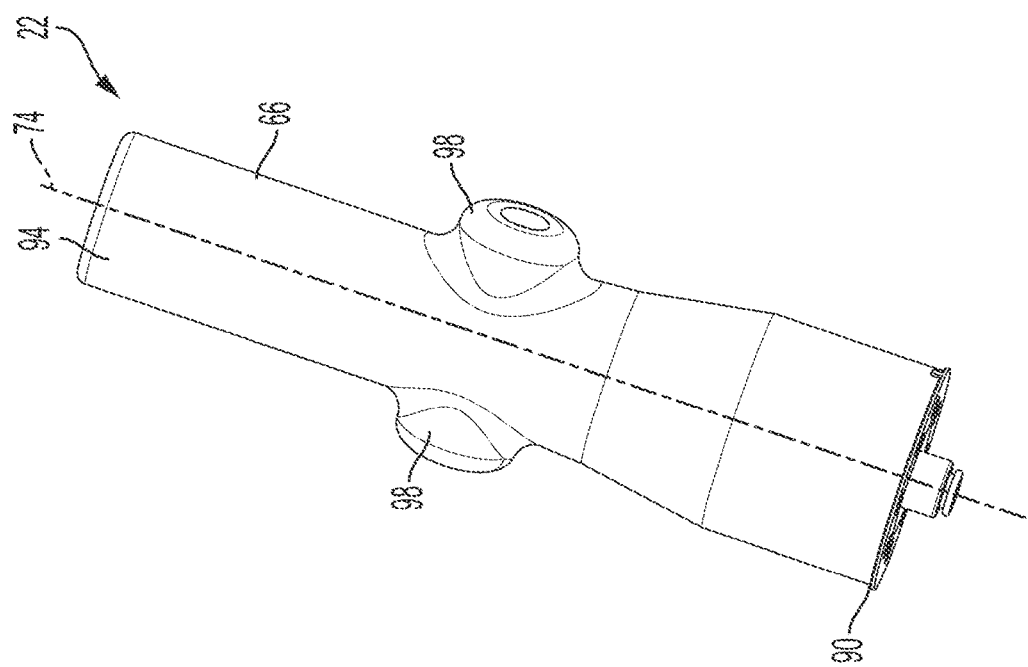
FIG. 6 is a perspective view of a loadbreak module of one of the plurality of switch assemblies of the switchgear system of FIG. 1.
Figure 8:
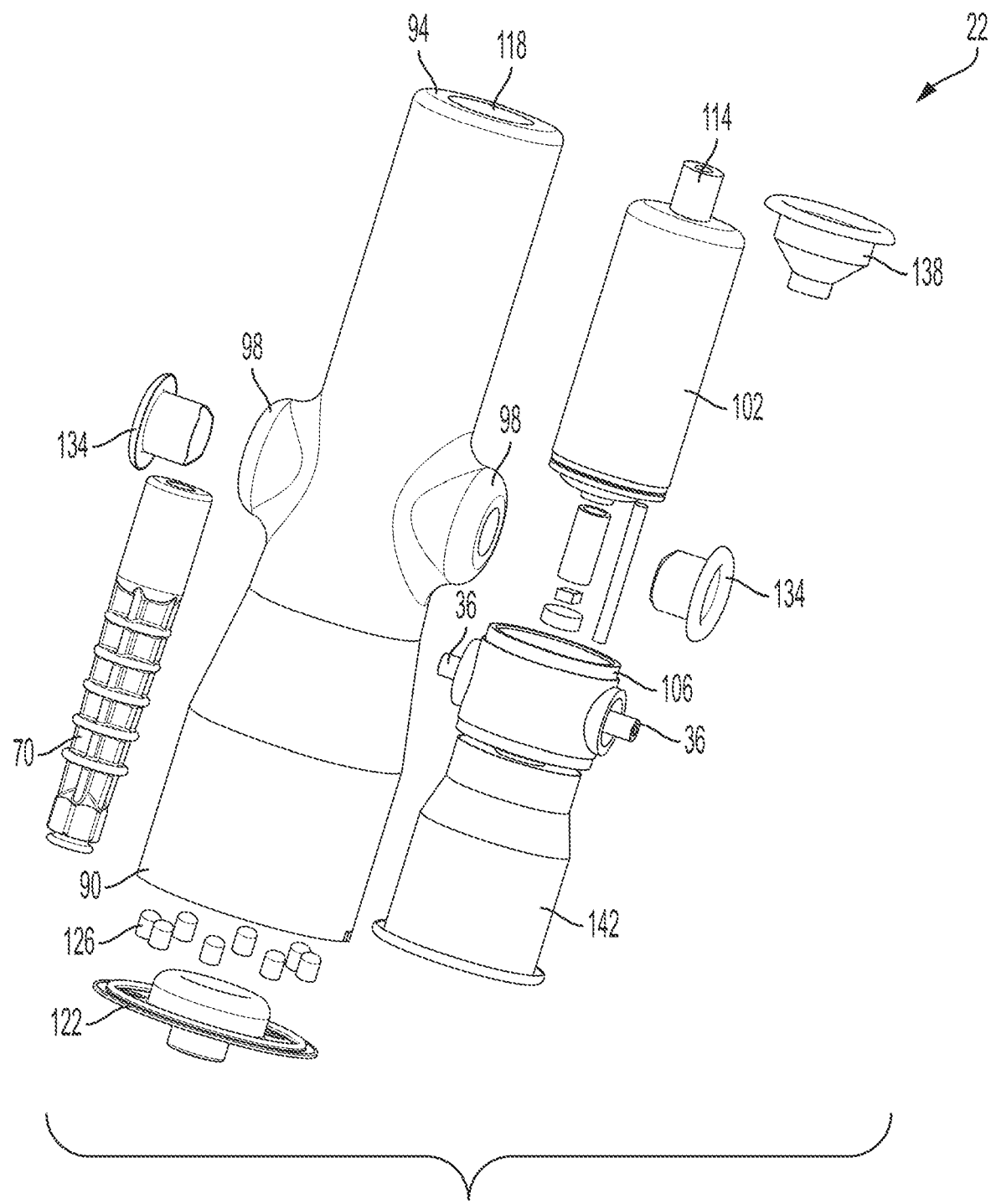
FIG. 8 is an exploded view of the loadbreak module of FIG. 6.

Referring to FIGS. 6-8, the housing 66 of each loadbreak module 22 is made of a solid dielectric material (e.g., a dielectric epoxy) and is preferably molded as a single, unitary body. The housing 66 includes a first end 90, a second end 94 opposite the first end 90, and a pair of shrouds 98 projecting radially outward at a position approximately midway between the first and second ends 90, 94. The housing 66 tapers inwardly from the first end 90 toward the shrouds 98.

With reference to FIG. 7, the drive shaft 70 and the vacuum interrupter 82 are centered within the housing 66 such that the axis 74 is a longitudinal center axis of the housing 66, the vacuum interrupter 82, and the drive shaft 70. The vacuum interrupter 82 includes a vacuum bottle 102 enclosing the contacts 78, 86 and an interchange 106 electrically connected to the movable contact 78. The line terminals 36 are electrically connected to the interchange 106 and extend radially outward from the interchange 106 in opposite directions and into openings 110 defined by the shrouds 98. The ends of the line terminals 36 are recessed within the shrouds 98 but accessible from an exterior of the housing 66 via the openings 110. The loadbreak module 22 also includes an upper terminal 114 electrically connected to the fixed contact 86 of the vacuum interrupter 82. The upper terminal 114 is positioned at the bottom of a recess 118 in the second end 94 of the housing 66. As such, an end of the upper terminal 114 is accessible from an exterior of the housing 66 via the recess 118.

With reference to FIG. 8, the illustrated loadbreak module 22 further includes an end cap 122 coupled to the housing 66 to cover the first end 90 of the housing 66. The end cap 122 is made of a dielectric material. For example, in the illustrated embodiment, the end cap 122 is made of silicone rubber. A plurality of internally threaded inserts 126 extend through a periphery of the end cap 122 and into the wall of the housing 66 at the first end 90. The drive shaft 70 also extends through the end cap 122. The drive shaft 70 is made of a dielectric material. The inserts 126 receive corresponding fasteners 120 (FIG. 4), which are preferably made of a dielectric material, to couple the loadbreak module 22 to the shelf 32 within the enclosure 14, without compromising the dielectric insulting properties of the housing 66.

With continued reference to FIG. 8, the loadbreak module 22 includes a line voltage screen 134 molded within each of the shrouds 98 of the housing 66 such that the line voltage screens 134 surround the respective line terminals 36. A load voltage screen 138 is molded within the housing 66 adjacent the second end 94 such that the load voltage screen 138 surrounds the upper terminal 114 of the loadbreak module 22. In the illustrated embodiment, an additional voltage screen 142 is molded within the housing 66 between the interchange 106 and the first end 90 of the housing 66. The voltage screens 134, 138, 142 are made of conductive and/or semi-conductive materials and distribute (and thereby reduce) electrical stresses developed at the interchange 106 and the terminals 36, 114. As such, the voltage screens 134, 138, 142 improve the insulating performance of the housing 66.

Figure 5:
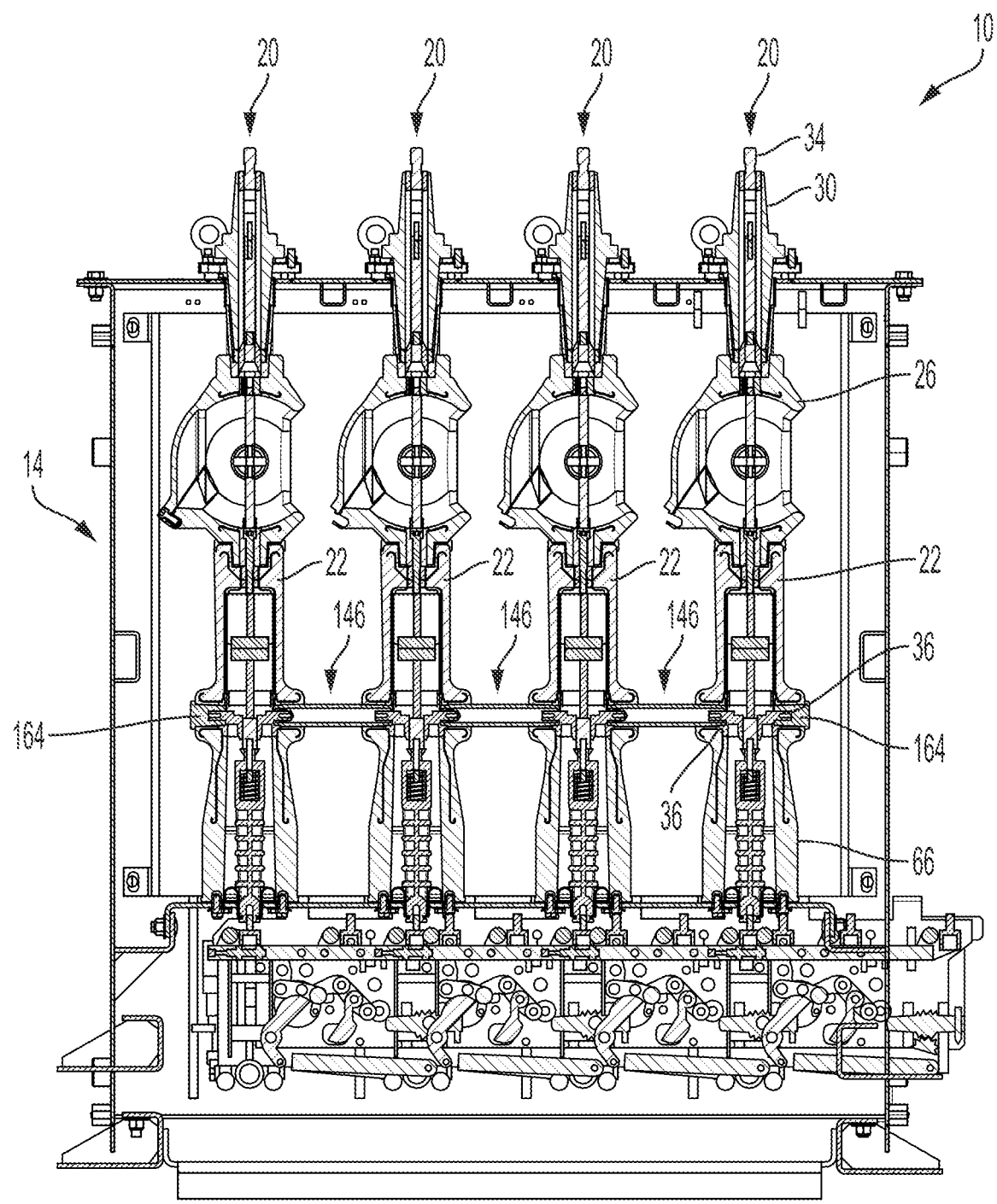
FIG. 5 is a cross-sectional view of the switchgear system of FIG. 1, taken along line 5-5 in FIG. 1, with a plurality of switch assemblies of the switchgear system illustrated in a closed position.
Figure 9:
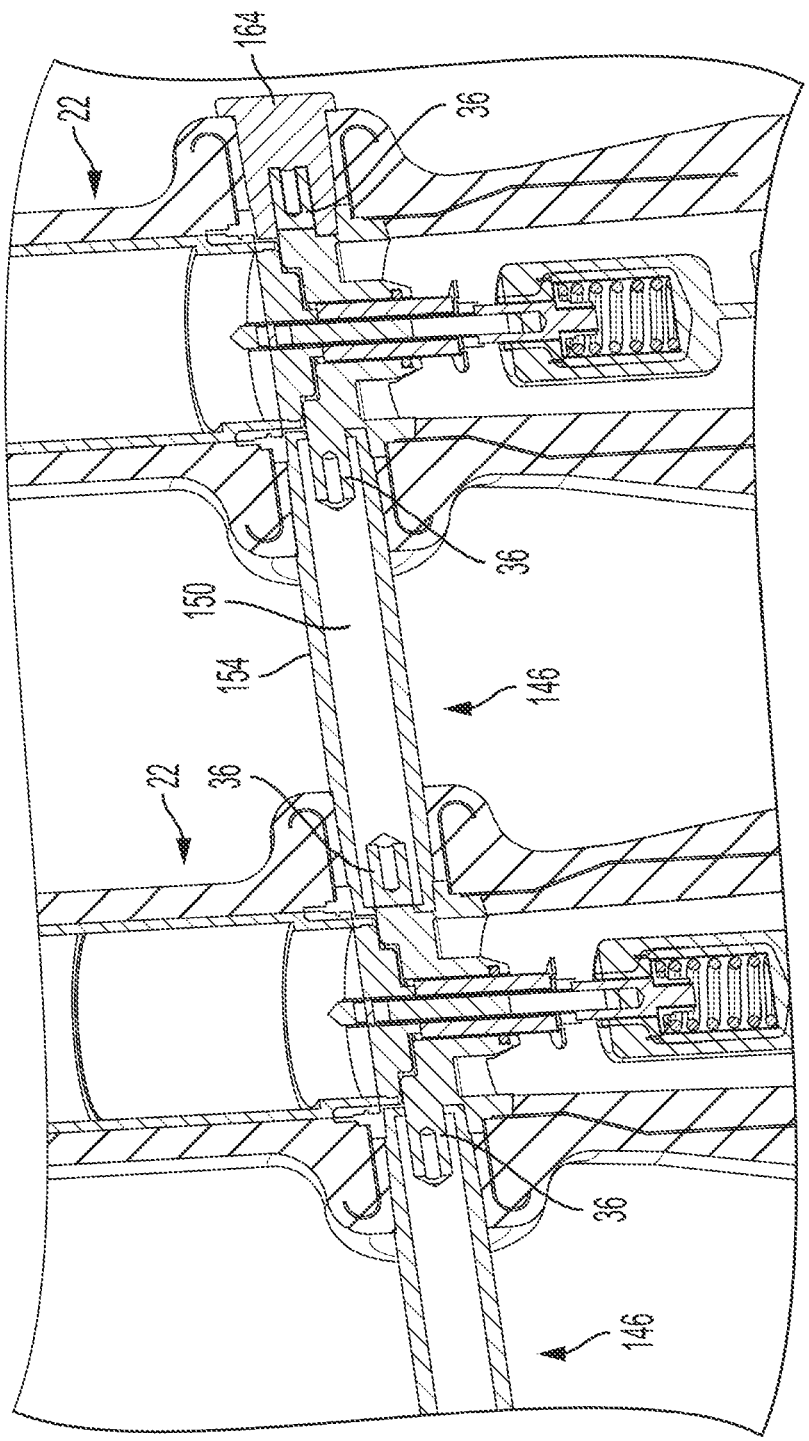
FIG. 9 is a cross-sectional view illustrating a way-to-way connection between two loadbreak modules of the switch assemblies of the switchgear system of FIG. 1.

With reference to FIG. 5, the line terminals 36 of the loadbreak modules 22 in adjacent ways 20 may be connected together by bridge assemblies 146. Best illustrated in FIGS. 9 and 10, each bridge assembly 146 includes a conductive rod 150 having a recess 154 at each end. The conductive rod 150 is made of an electrically conductive material, such as copper or a copper alloy. The recesses 154 are sized and shaped to receive a post 159 of the line terminal 36. The conductive rod 150 is surrounded by a dielectric sleeve 158, which, in the illustrated embodiment, is made of a resilient and flexible dielectric material such as silicone.

The sleeve 158 covers the entire outer circumferential surface of the conductive rod 150, as well as at least a portion of each end of the conductive rod 150. Each of the line terminals 36 includes a recess 160 surrounding the post 159, and the recess 160 is sized and shaped to receive the end of the bridge assembly 146. The recess 160 preferably has a diameter slightly smaller than the diameter of the sleeve 158, such that the sleeve 158 is compressed upon insertion into the recess 160, thereby forming a dielectric seal therebetween. In some embodiments, the opening 110 in the shroud 98 may also be sized slightly smaller than the diameter of the sleeve 158.

Figure 10:
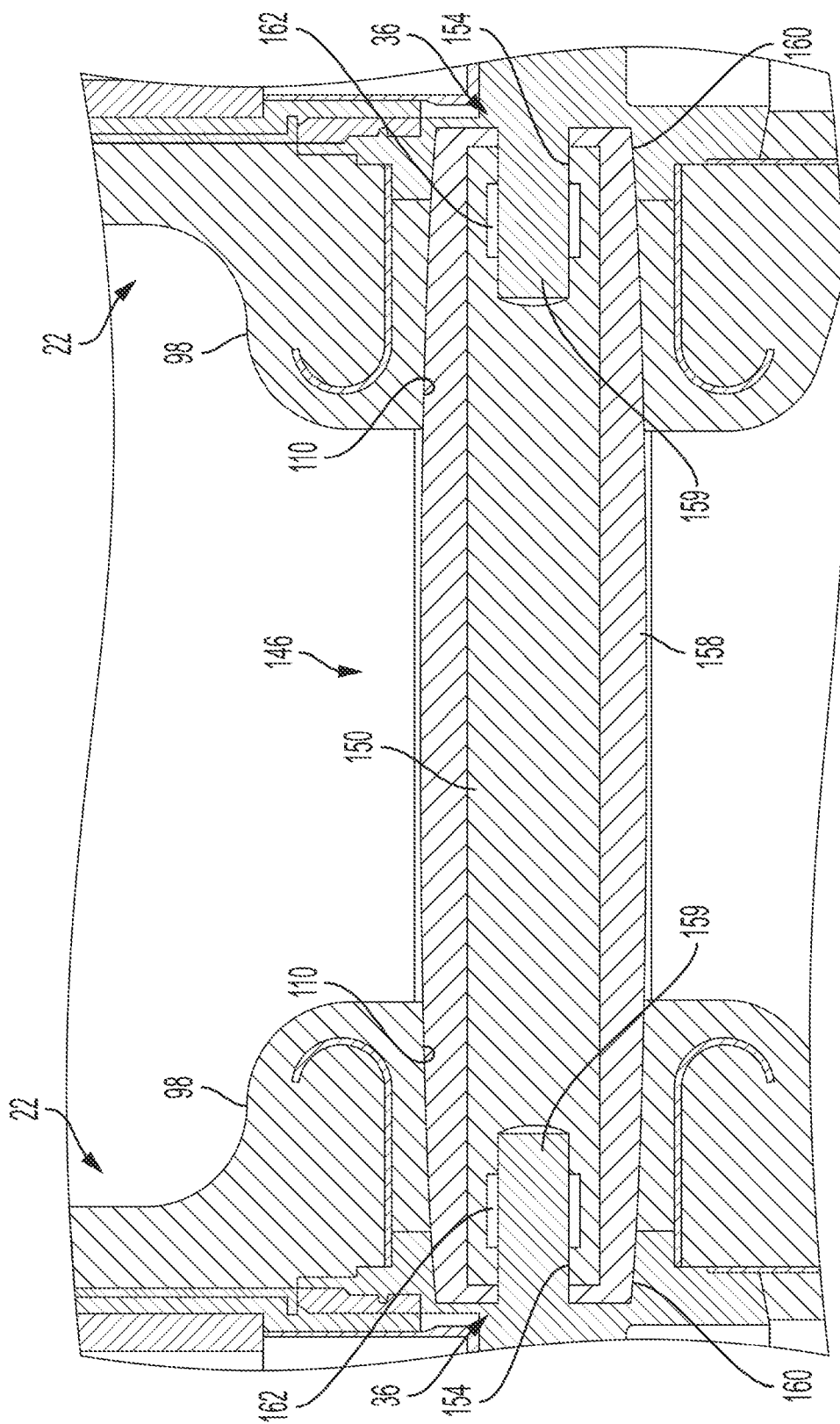
FIG. 10 is another cross-sectional view illustrating the way-to-way connection of FIG. 9.

With reference to FIG. 10, the recesses 154 of the conductive rod 150 each accommodate an electrically conductive contact band 162, such as a high current contact band produced by ICORE INTERNATIONAL. The contact bands 162 are preferably made of a resilient, highly conductive, and heat resistant material and provide a reliable electrical connection between the line terminals 36 and the conductive rod 150.

The bridge assembly 146 is able to be attached to the desired line terminals 36 via a sliding, press-fit connection, and the connection is fully insulated without requiring any additional steps (e.g., shrink-wrapping, etc.). This greatly simplifies installation of the bridge assemblies 146 and the corresponding interconnection of ways 20 in the switchgear system 10. More specifically, to connect the line terminal 36 of a loadbreak module 22 to the bridge assembly 146, the bridge assembly 146 is aligned with the opening 110 in the shroud 98, and the end of the bridge assembly 146 is then inserted into the opening 110, until the portion of the sleeve 158 covering the inserted end of the conductive rod 150 contacts a base of the recess 160. The sleeve 158 may be compressed against the base of the recess 160 to form a dielectric seal therebetween.

With continued reference to FIG. 10, the projecting post 159 of the line terminal 36 enters the recess 154 in the end of the conductive rod 150 and expands the resilient contact band 162 radially outwardly. The expansion of the contact band 162 develops a resilient recovery force in the contact band 162 that acts radially inwardly against the post 159. This ensures reliable conductive contact between the contact band 162 and the post 159. The contact band 162 is also in conductive contact with the conductive rod 150, thus providing a reliable electrical connection between the line terminal 36 and the conductive rod 150.

Referring to FIG. 5, because each loadbreak module 22 includes two line terminals 36 disposed on opposite sides of the housing 66, identical loadbreak modules 22 can be used in each of the ways 20 and efficiently interconnected using bridge assemblies 146. As such, the loadbreak module 22 provides the switchgear system 10 with modularity in that identical loadbreak modules 22 can be used to configure the switchgear system 10 to have any desired number of ways 20. Line terminals 36 that are not interconnected with bridge assemblies 146 are preferably covered with a dielectric cap 164 that seals against the housing 66.

Referring to FIG. 4, each disconnect actuator mechanism 50 includes a handle 168 to operate the disconnect actuator mechanism 50. The handle 168 is preferably accessible from outside the enclosure 14 to permit a user to manually operate the disconnect actuator mechanism 50. The handle 168 is preferably positioned on the same side of the enclosure 14 as the handle 54. In other embodiments, the disconnect actuator mechanism 50 may additionally or alternatively be configured for automatic and/or remote operation. As such, the handles 168 may be omitted in some embodiments. In some embodiments, the disconnect actuator mechanisms 50 and the loadbreak actuator mechanisms 46 may be interlocked, via a mechanical interlock, an electronic (e.g., software-based) interlock, or both, such that the disconnect actuator mechanism 50 for a given way 20 may only be actuated by the disconnect actuator mechanism 50 when the loadbreak modules 22 are in an open position.

The handle 168 is coupled for co-rotation with a second actuator shaft 172 that extends into the enclosure 14 along a third longitudinal axis 176 that is parallel to the first longitudinal axis 62. In the illustrated embodiment, the second actuator shaft 172 includes a plurality of segments 180 coupled for co-rotation by a key and keyway arrangement. Each of the segments 180 may be provided as a part of a respective disconnect switch 26, for example, such that the segments 180 of adjacent disconnect switches 26 in the way 20 are interconnected for co-rotation. In other embodiments, the second actuator shaft 172 may be a unitary structure.

Figure 11:
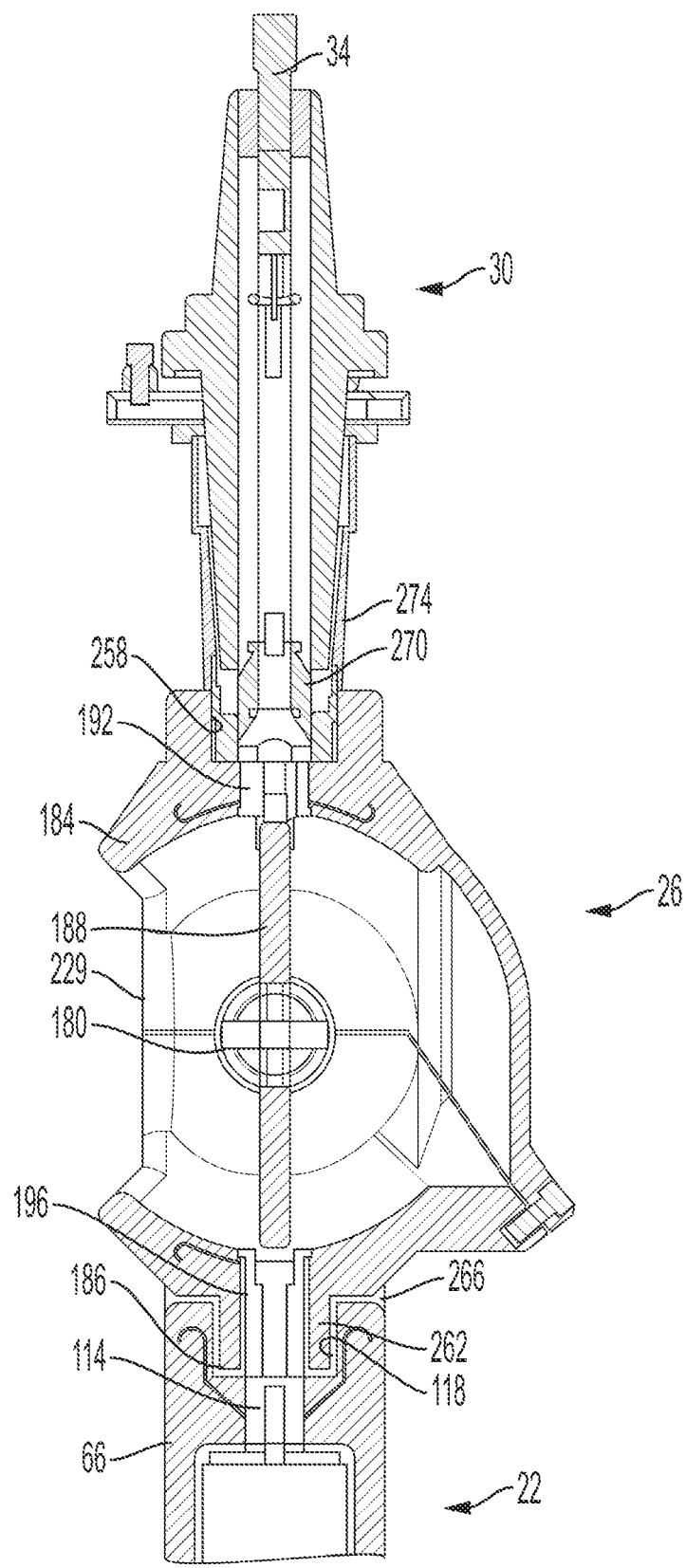
FIG. 11 is a cross-sectional view illustrating a disconnect switch connected between a bushing and a loadbreak module of one of the switch assemblies of the switchgear system of FIG. 1, with the disconnect switch being illustrated in a closed position.

Each of the disconnect switches 26 in the illustrated embodiment includes a housing 184 and a conductor in the form of a conductive blade 188. The blade 188 is fixed to the shaft segment 180 for co-rotation therewith about the third longitudinal axis 176. The blade 188 is selectively alignable with an upper contact 192 and a lower contact 196 of the disconnect switch 26 to engage the contacts 192, 196 and thereby establish an electrical connection between the contacts 192, 196 through the blade 188. The upper contact 192 is electrically connected to the load terminal 34 of the bushing 30, and the lower contact 196 is electrically connected to the fixed contact 86 of the associated loadbreak module 22 (via the upper terminal 114 of the loadbreak module 22) (FIG. 11). Thus, rotation of the handle 168 and shaft 172 about the third axis 176 rotates the blades 188 of the disconnect switches 26 relative to the contacts 192, 196 to selectively break or establish an electrical connection between the contacts 192, 196.

Figure 16:
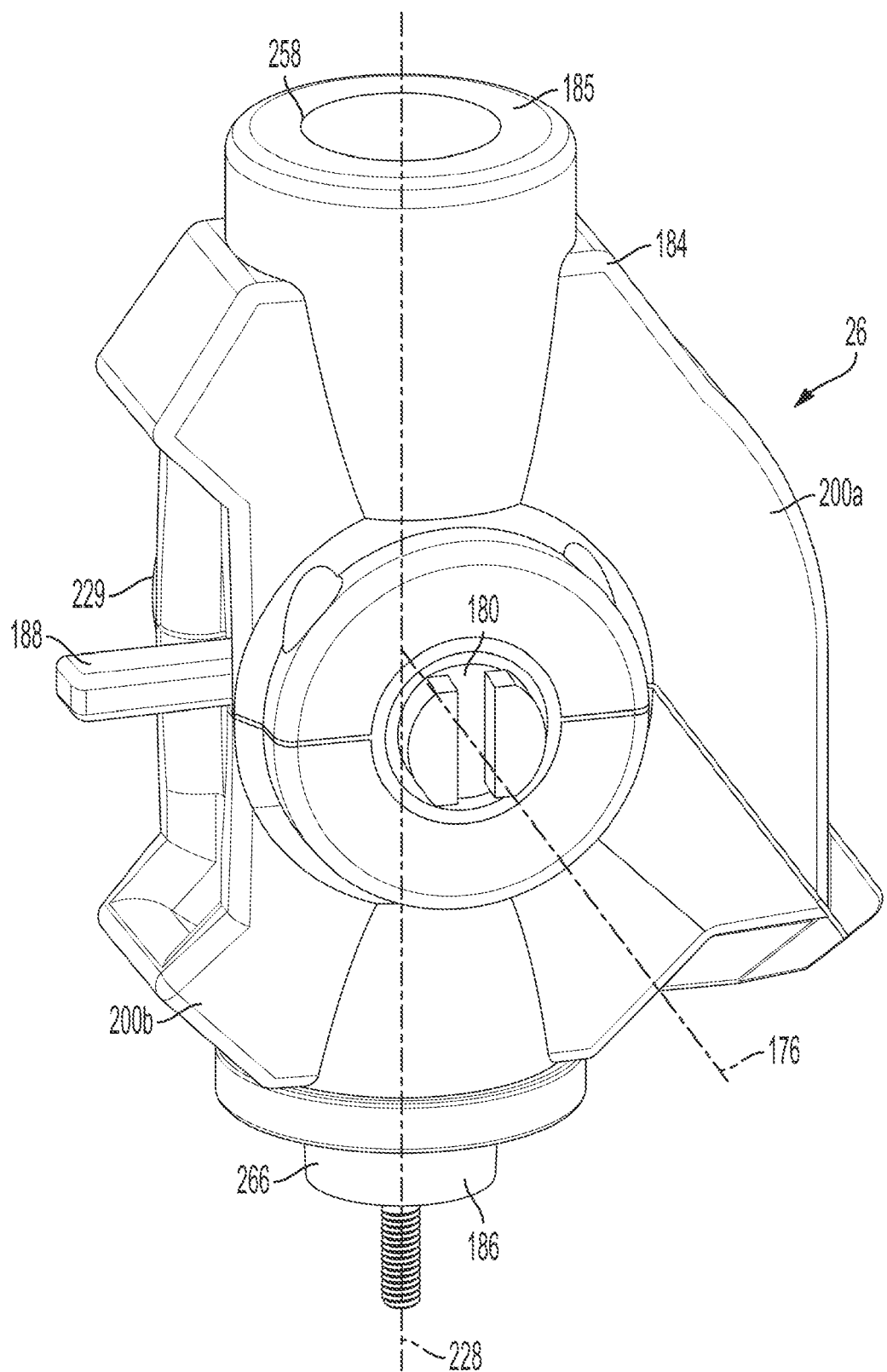
FIG. 16 is a perspective view of a disconnect switch of one of the switch assemblies of the switchgear system of FIG. 1 or 14, with the disconnect switch illustrated in an open position.
Figure 17:
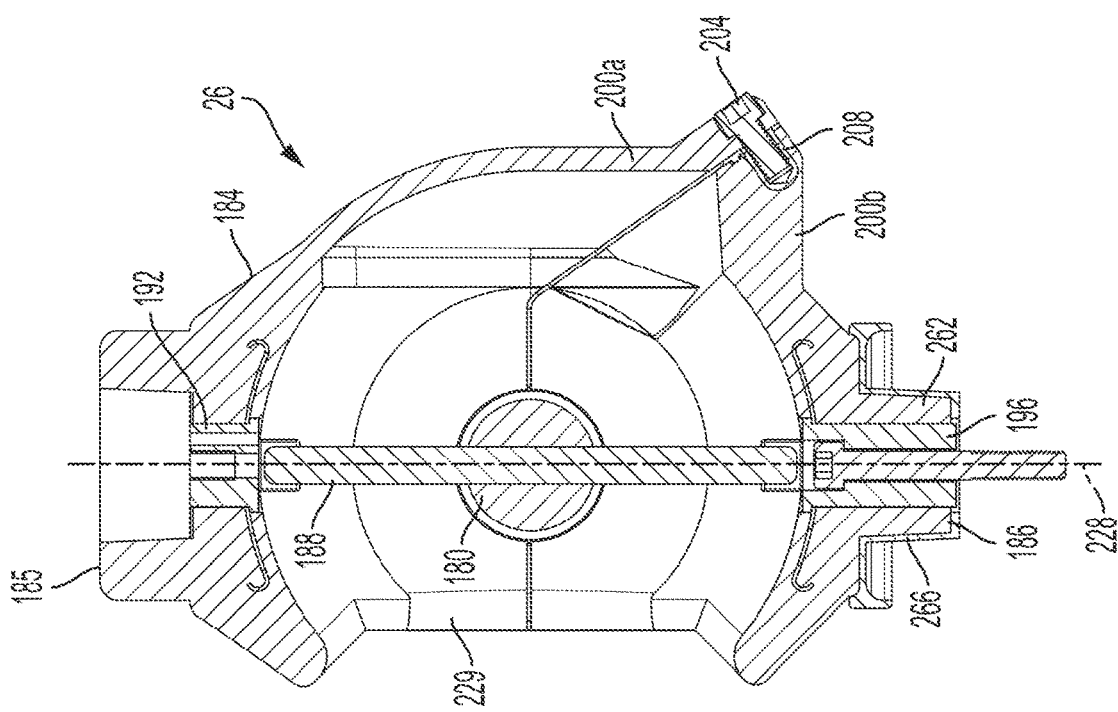
FIG. 17 is a cross-sectional view of the disconnect switch of FIG. 16, illustrating a blade of the disconnect switch in an open position.
Figure 18:
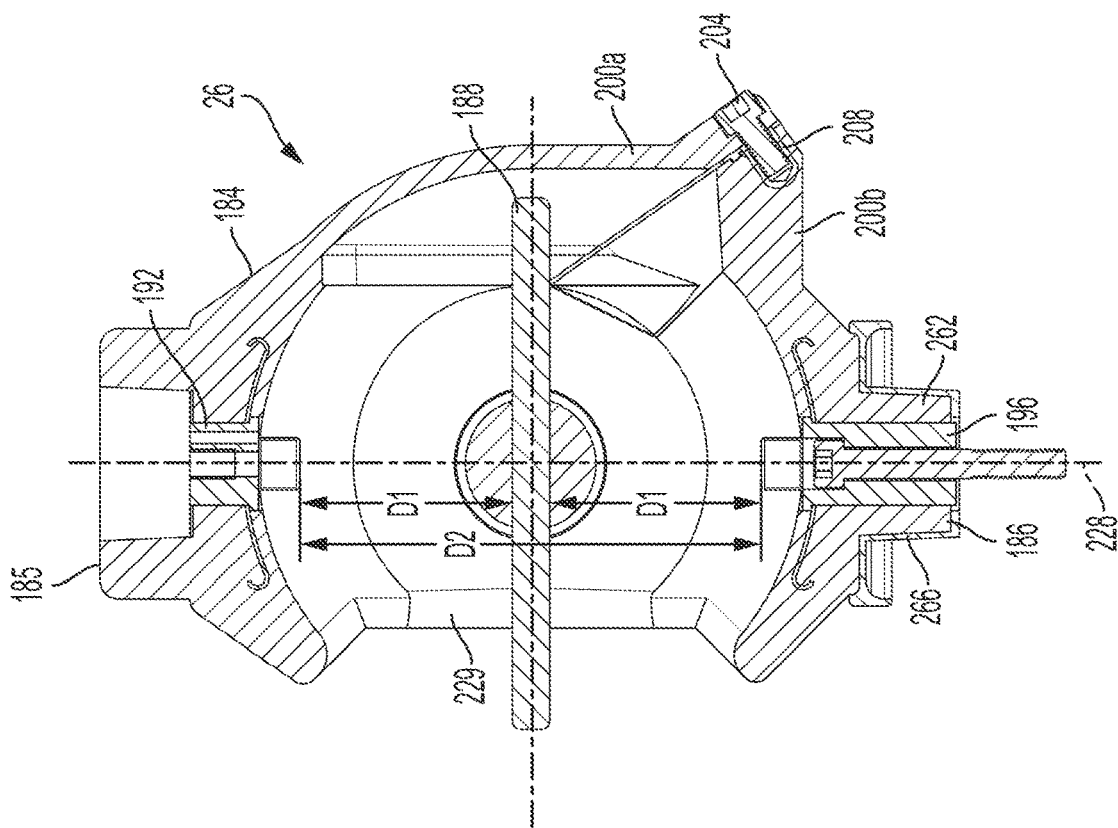
FIG. 18 is a cross-sectional view of the disconnect switch of FIG. 16, illustrating the blade in a closed position.
Figure 19:
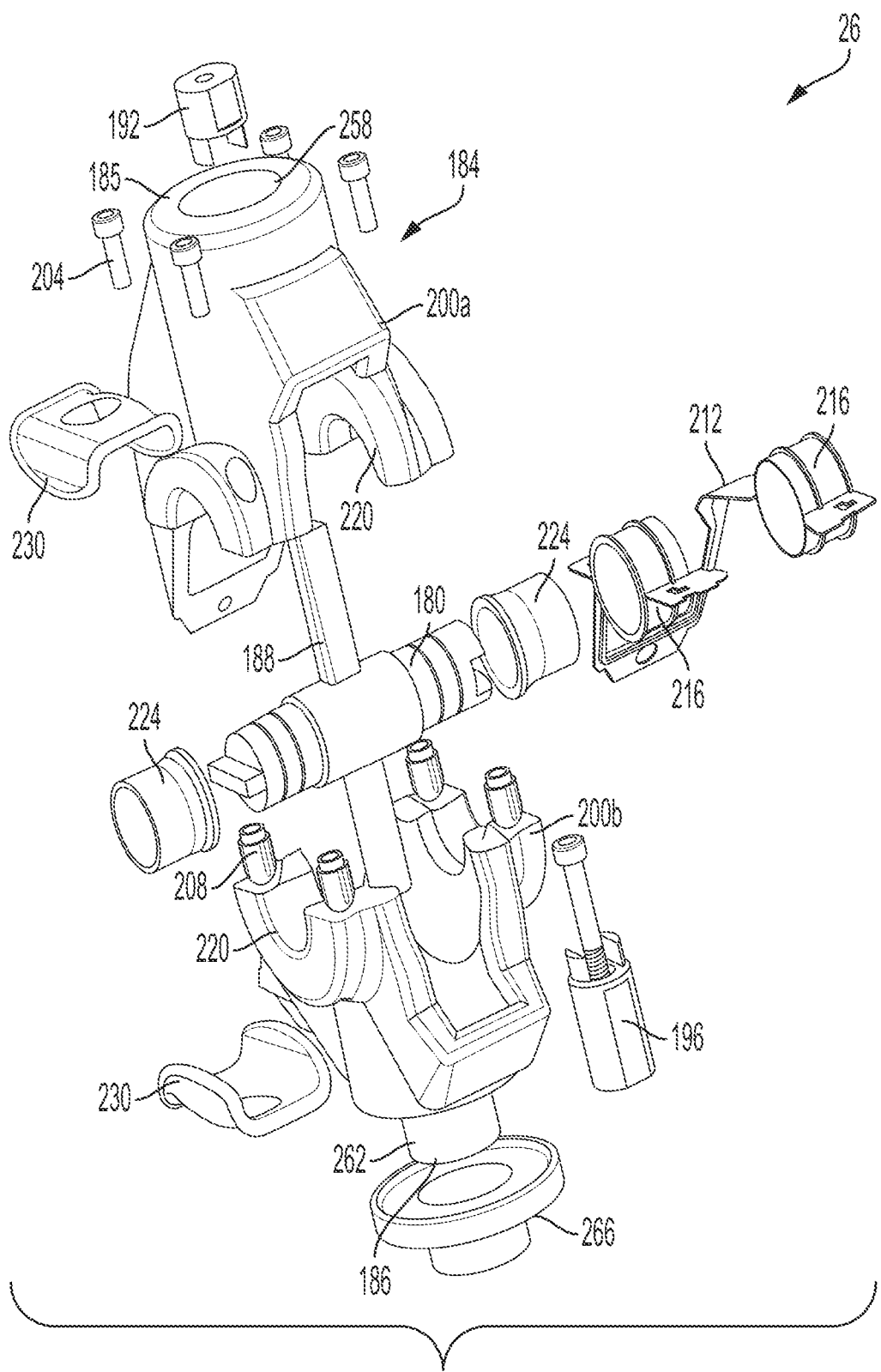
FIG. 19 is an exploded view of the disconnect switch of FIG. 16

Referring to FIGS. 16-19, the housing 184 of the disconnect switch 26 includes a first end 185 and a second end 186 opposite the first end 185. The housing 184 is made of a solid dielectric material (e.g., a dielectric epoxy) and is preferably molded in two parts 200a, 200b which are subsequently coupled together. The first part 200a includes the first end 185, and the second part 200b includes the second end 186. In the illustrated embodiment, the two parts 200a, 200b are coupled together by a plurality of threaded fasteners 204, which are made of a dielectric material, such as polyether ether ketone ("PEEK") (FIG. 19). More specifically, each of the threaded fasteners 204 extends through a respective counter-sunk through-hole sized to receive the fastener 204 and formed in the first housing part 200a and are threadably engaged with inserts 208 positioned in the second housing part 200b (FIGS. 17-18). Each insert 208 is pressed into an opening aligned with one of the through-holes of the first housing part 200a or insert-molded within the second housing part 200b to align with one of the through-holes formed in the first housing part 200a. Like the fasteners 204, the inserts 208 are made of a dielectric material, such as a thermoplastic material.

With continued reference to FIG. 19, a gasket 212 is provided between the housing parts 200a, 200b to form a dielectric seal therebetween. The gasket 212 is preferably made of a resilient dielectric material, such as silicone. The illustrated gasket 212 includes two tubular portions 216 that line the inner circumferential surfaces of respective bores 220 that extend through opposite sides of the housing 184. The bores 220 are defined by cooperation of the housing parts 200a, 200b. That is, upper half of each bore 220 is defined by the first housing part 200a, and the lower half of each bore 220 is defined by the lower housing part 200b.

Each of the bores 220 receives a bushing 224, which, in the illustrated embodiments, are surrounded by the tubular portions 216 of the gasket 212 such that the gasket 212 provides a dielectric seal between the outer circumferential surfaces of the bushings 224 and the inner circumferential surfaces of the bores 220. The bushings 224 are preferably made of a dielectric material, such as a thermoplastic material. The bushings 224 receive the ends of the shaft segment 180 to rotatably support the shaft segment 180 within the housing 184. The shaft segment 180 is also preferably made of a dielectric material, such as a thermoplastic material.

With reference to FIGS. 16-18, a fourth longitudinal axis 228 extends centrally through the contacts 192, 196 of the disconnect switch 26. In some embodiments, the fourth axis 228 is coaxial with the second axis 74 of the connected loadbreak module 22 (FIG. 4). The shaft segment 180 and the blade 188 are rotatable together about the third axis 176, which is perpendicular to the fourth axis 228, between a first position or open position (FIGS. 16 and 17), in which the blade 188 is spaced from the contacts 192, 196, and a second position or closed position (FIG. 18), in which the blade 188 engages the contacts 192, 196 to establish an electrical connection between the contacts 192, 196. In the illustrated embodiment, the blade 188 rotates about 90 degrees between the first position and the second position; however the first position and the second position may be offset by other angles in other embodiments.

When the blade 188 is in the open position, as shown in FIGS. 16 and 17, an end of the blade 188 projects outwardly through a window 229 formed in the housing 184. The end of the blade 188 is therefore visible from outside the housing 184 of the disconnect switch 26, which may provide a user of a visual indication of the operational status of the disconnect switch 26 (i.e. whether the disconnect switch 26 is in the first position or the second position). In some embodiments, the enclosure 14 may include one or more transparent windows 231 (FIG. 1) generally aligned with the disconnect switches 26, allowing a user to directly observe the blades 188.

Referring to FIG. 17, a minimum distance D1 between the blade 188 and each of the contacts 192, 196 is between 2 inches and 4 inches in some embodiments, between 2.5 inches and 3.5 inches in some embodiments, or about 2.82 inches in the illustrated embodiment. An overall distance D2 between the contacts 192, 196 is between 5 inches and 8 inches in some embodiments, between 6 inches and 7 inches in some embodiments, or about 6.15 inches in the illustrated embodiment. The illustrated disconnect switch 26 includes voltage screens 230 molded within the housing 184 and surrounding the respective contacts 192, 196 to direct electrical stresses from the contacts 192, 196 into the solid dielectric insulating material of the housing 184, which has higher insulative properties than air. As such, the dimensions D1 and D2, and thus the overall size (e.g., distance between the ends 185, 186) of the disconnect switch 26 can be minimized without risk of arcing between the contacts 192, 196 and the blade 188.

With reference to FIGS. 20-23, each of the voltage screens 230 includes a base 234 and wings 238 extending from opposite sides of the base 234 to define a generally U-shaped cross-section. The base 234 is curved, with a radius of curvature proportional to the length of the blade 188. For example, the radius of curvature of the base 234 may be about half the length of the blade 188. The wings 238 are also curved, such that each of the wings 238 has a greater height at the center of the voltage screen 230 than at the end of the voltage screen 230. The voltage screens 230 may be made of any suitable conductive or semi-conductive material capable of distributing electrical stresses from the contacts 192, 196. In some embodiments, the screens 230 may be 3D printed, which may be a particularly effective method for forming the complex three-dimensional shape of the screens 230. In other embodiments, the screens 230 may be molded or manufactured in other ways.

Figure 20:
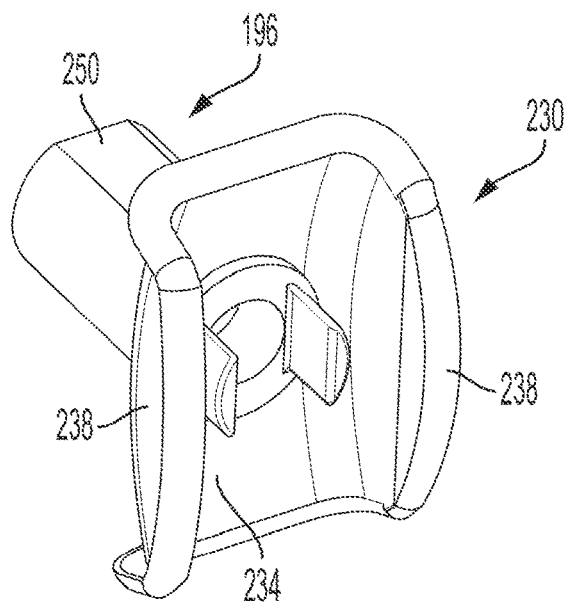
FIG. 20 is a perspective view illustrating a voltage screen and terminal of the disconnect switch of FIG. 16.
Figure 21:
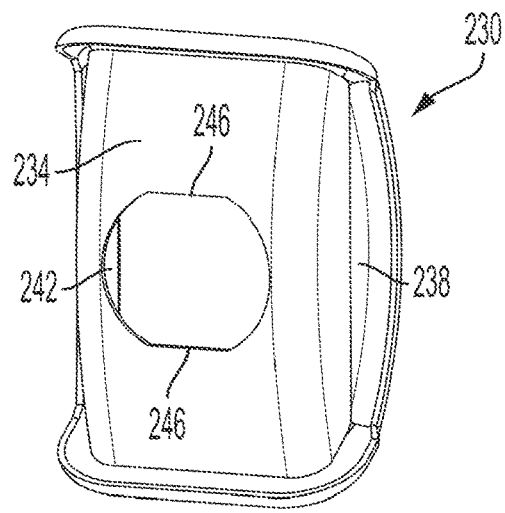
FIG. 21 is a perspective view illustrating the voltage screen of FIG. 20.
Figure 22:
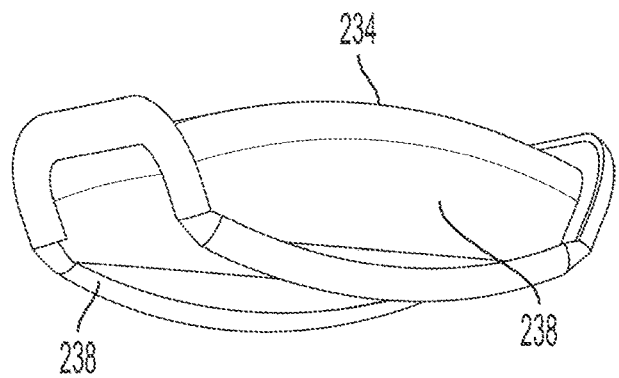
FIG. 22 is another perspective view illustrating the voltage screen of FIG. 20.
Figure 23:
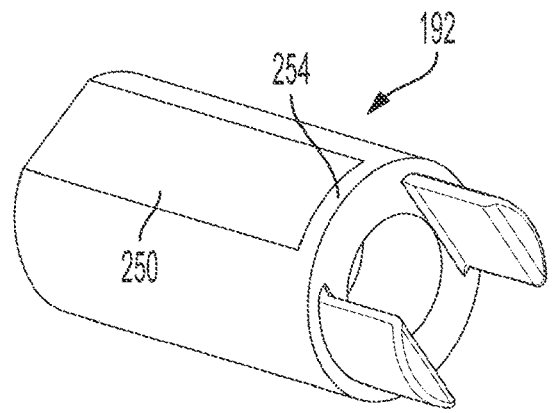
FIG. 23 is a perspective view illustrating the terminal of FIG. 20.

Each of the screens 230 has a central opening 242 through which the associated contact 192, 196 extends. In the illustrated embodiment, the opening 242 includes flats 246 that are configured to align with corresponding flats 250 formed on the respective contacts 192, 196 (FIGS. 20, 21, 23). The flats 246, 250 thus serve to guide insertion of the contacts 192, 196 into the opening 242 during assembly of the disconnect switch 26, prior to molding the housing parts 200a, 200b around the screens 230 and contacts 192, 196. The contacts 192, 196 also include a shoulder 254 configured to abut the base 234 when the contacts 192, 196 are inserted into the screens 230, which facilitates placing the contacts 192, 196 at an appropriate depth relative to the screens 230 and in turn facilitates reliable performance of the voltage screens 230.

Referring to FIG. 18, the structure of the disconnect switch 26 facilitates manufacturing and assembly, while improving the reliability of the solid-dielectric insulation that insulates all of the power-conducting components of the disconnect switch 26. In some embodiments, the manufacture the disconnect switch 26, the upper and lower contacts 192, 196 are first inserted into the respective screens 230 as described above. The first and second housing parts 200a, 200b are then molded around the contacts 192, 196 and screens 230 to form the solid dielectric housing 184. The blade 188 is inserted into the shaft segment 180, and the bushings 224 are place around the ends of the shaft segment 180. The bushings 224 are then inserted into the tubular portions 216 of the gasket 212.

The inserts 208 are pressed into the second housing portion 200b (or, in some embodiments, insert molded within the second housing portion 200b. The shaft segment 180, together with the bushings 224 and gasket 212 are aligned with respect to the bores 220 in the housing 184, and the housing parts 200a, 200b are brought together around the shaft segment 180. The fasteners 204 are then inserted through the first housing part 200a and tightened into the inserts 208 fixed to the second housing part 200b. This secures the two housing parts 200a, 200b together and compresses the gasket 212, forming a dielectric seal between the housing parts 200a, 200b.

Figure 13:
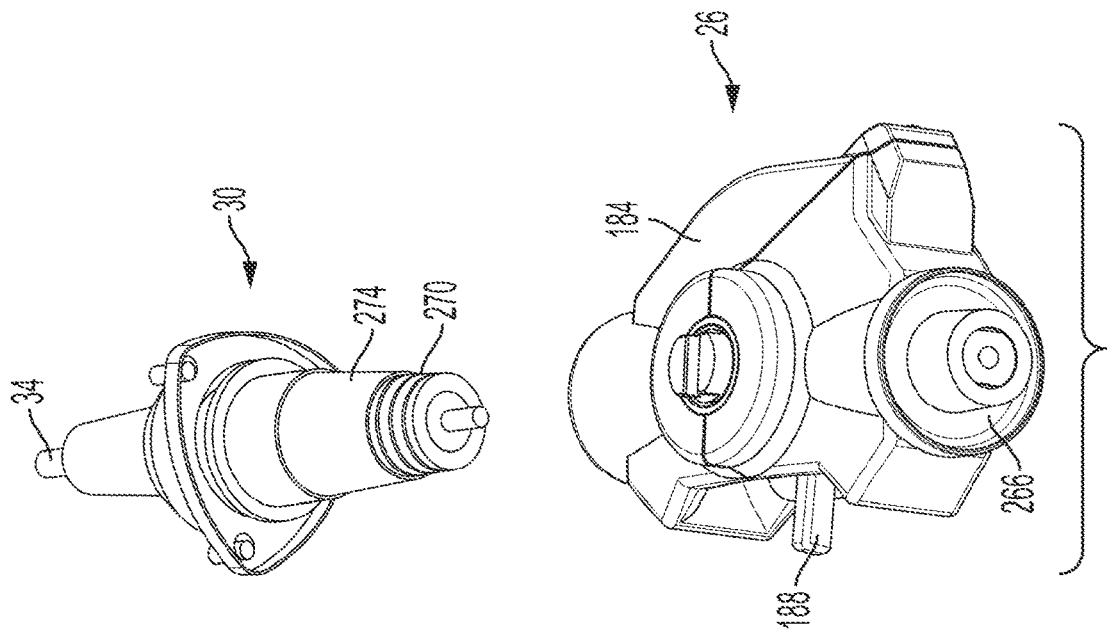
FIG. 13 is a bottom exploded view illustrating the connection interface of FIG. 12.
Figure 12:
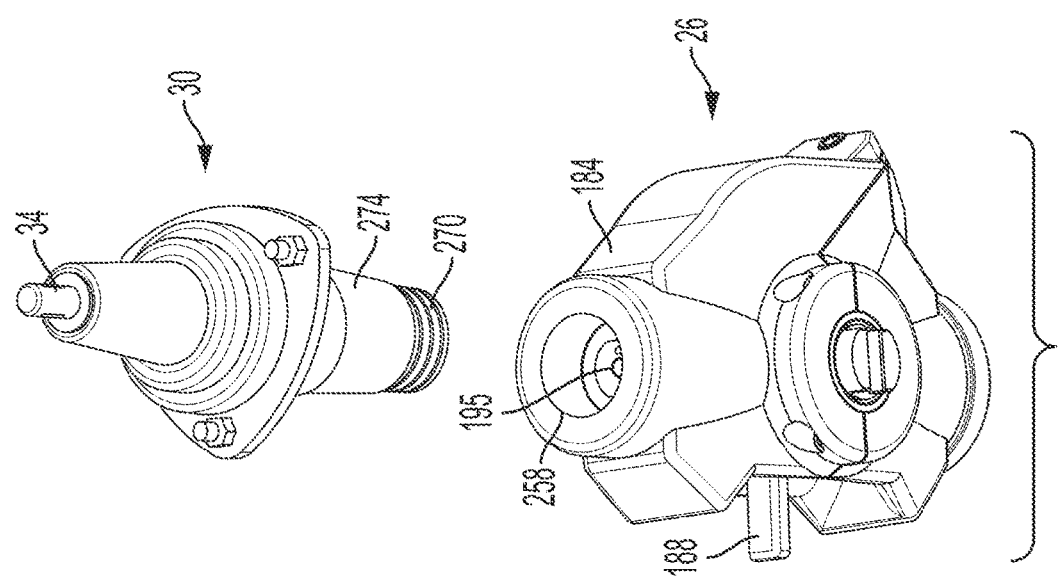
FIG. 12 is a top exploded view illustrating a connection interface of the bushing and the disconnect switch of FIG. 11.

Referring to FIGS. 17-19, the disconnect switch 26 is also configured to provide a reliable, insulated electrical connection with the bushing 30 and the loadbreak module 22 without requiring any extra insulating steps. For example, in the illustrated embodiment, the disconnect switch 26 includes a recess 258 formed in the first end 185 of the housing 184 and a tapered boss 262 defining the second end 186 of the housing 184. The boss 262 is covered by a sleeve 266, made of a resilient dielectric material, such as silicone. Referring to FIGS. 12-13, each bushing 30 also includes a tapered boss 270 opposite the load terminal 34. The boss 270 on the bushing 30 is insertable into the recess 258 in the housing 184 of the disconnect switch 26 to electrically couple the load terminal 34 of the bushing 30 to the upper contact 192, an end of which is exposed at the bottom of the recess 258. (FIG. 11). The sleeve 274 around the boss 270 is compressed upon insertion of the boss 270 into the recess 258, thereby forming a dielectric seal between the boss 270 and the inner circumference of the recess 258.

Similarly, the boss 262 at the opposite end of the disconnect switch 26 is insertable into the recess 118 in the housing 66 of the loadbreak module 22 to electrically couple the lower contact 196 to the upper terminal 114. The sleeve 266 around the boss 262 is compressed upon insertion of the boss 262 into the recess 118, thereby forming a seal between the boss 262 and the inner circumference of the recess 258.

Figure 15:
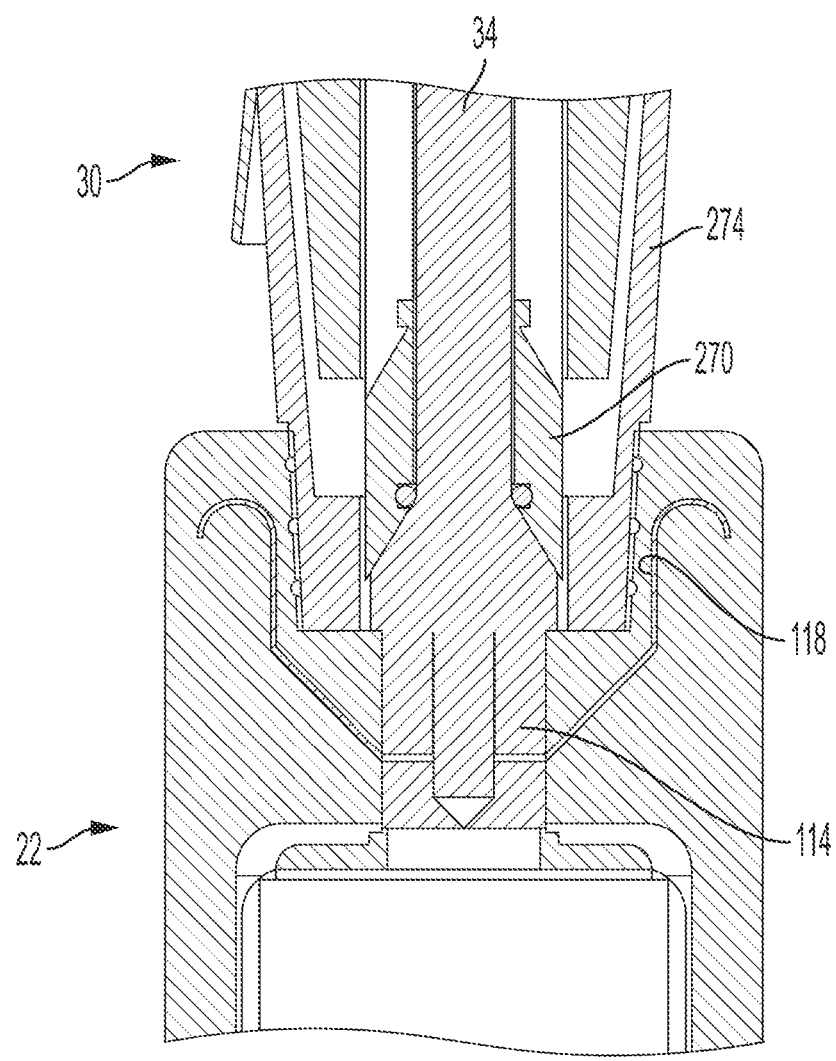
FIG. 15 is a cross-sectional view illustrating a connection interface between a bushing and a loadbreak module of one of the switch assemblies of the switchgear system of FIG. 14.

In some embodiments, the bosses 262, 270, sleeves 266, 274, and recesses 118, 258 are sized to permit interchangeable connections between the bushings 30, disconnect switches 26, and loadbreak modules 22. More specifically, in some embodiments, a switchgear system 10' (FIG. 14) may be provided that includes loadbreak modules 22 and bushings 30 identical to those of the switchgear system 10, but the disconnect switches 26 are omitted such that the bushings 30 are coupled directly to the loadbreak modules 22. As such, the boss 270 and sleeve 274 of the bushing 30 are inserted into the recess 118 of the associated loadbreak module 22 to electrically couple the load terminal 34 to the upper terminal 114 of the loadbreak module 22 (FIG. 15). Thus, switchgear systems 10, 10' both with and without disconnect switches 26 may be readily assembled using identical bushings 30 and loadbreak modules 22. This advantageously reduces manufacturing costs and complexity.

Although the disclosure has been described in detail with reference to certain preferred embodiments, variations and modifications exist within the scope and spirit of one or more independent aspects of the disclosure as described.

Various features of the disclosure are set forth in the following claims.

What is claimed is:

1. A switchgear system operable at voltages up to 27 kV, the switchgear system comprising:
   an enclosure containing atmospheric air;
   a loadbreak module disposed within the enclosure, the loadbreak module including
      a loadbreak module housing made of a solid dielectric material,
      a vacuum interrupter enclosed within the loadbreak module housing and having a fixed contact and a movable contact,
      an interchange electrically connected to the movable contact, wherein the movable contact is movable along a first axis,
      a first terminal electrically connected to the interchange,
      a second terminal electrically connected to the interchange, wherein the second terminal is coaxial with the first terminal along a second axis that is perpendicular to the first axis, and wherein the first terminal and the second terminal are disposed on opposite sides of the interchange, and
      a third terminal electrically connected to the fixed contact,
      wherein the vacuum interrupter is operable to selectively break or establish an electrical pathway between the interchange and the third terminal in response to movement of the movable contact relative to the fixed contact;
   a bushing coupled to the enclosure, the bushing including a fourth terminal accessible from outside the enclosure; and
   a disconnect switch electrically connected in series between the loadbreak module and the bushing, the disconnect switch including
      a disconnect switch housing made of a solid dielectric material,
      a blade rotatably coupled to the disconnect switch housing,
      a first contact electrically connected to the fourth terminal, and
      a second contact electrically connected to the third terminal,
      wherein the blade is rotatable relative to the disconnect switch housing between a first position in which the blade is spaced from the first contact and the second contact such that the third terminal is electrically disconnected from the fourth terminal, and a second position in which the blade engages the first contact and the second contact to establish an electrical connection between the third terminal and the fourth terminal.

2. The switchgear system of claim 1, wherein the disconnect switch housing includes a window, and wherein an end of the blade extends through the window when the blade is in the first position.

3. The switchgear system of claim 1, wherein the bushing includes a first sleeve surrounding a first boss, the first boss received in a first recess in the disconnect switch housing to electrically connect the fourth terminal and the first contact, and wherein the disconnect switch housing includes a second sleeve surrounding a second boss, the second boss received in a second recess in the loadbreak module housing to electrically connect the third terminal and the second contact.

4. The switchgear system of claim 1, wherein the loadbreak module housing includes a first shroud surrounding a first opening in the loadbreak module housing, wherein the first terminal is aligned with the first opening, wherein the loadbreak module housing includes a second shroud surrounding a second opening in the loadbreak module housing, and wherein the second terminal is aligned with the second opening.

5. The switchgear system of claim 1, wherein the loadbreak module is a first loadbreak module, and wherein the switchgear system further comprises
   a second loadbreak module identical to the first loadbreak module; and
   a bridge assembly electrically connecting the first terminal or the second terminal of the first loadbreak module to a first terminal or a second terminal of the second loadbreak module.

6. The switchgear system of claim 5, wherein each of the first terminal and the second terminal of the first loadbreak module and the second loadbreak module includes a post, and wherein the bridge assembly includes a conductive rod having a recess configured to slidably receive the post.

7. The switchgear system of claim 6, wherein the bridge assembly includes a resilient contact band disposed within the recess, and wherein insertion of the post into the recess resiliently expands the contact band.

8. The switchgear system of claim 1, wherein the blade is fixed to a segment of an actuator shaft rotatable relative to the loadbreak module housing between the first position in which the blade is spaced from the first contact and the second contact such that the third terminal is electrically disconnected from the fourth terminal, and the second position in which the blade engages the first contact and the second contact to establish an electrical connection between the third terminal and the fourth terminal,
wherein the loadbreak module is a first loadbreak module,
wherein the switchgear system further comprises a second loadbreak module identical to the first loadbreak module, and
wherein the segment is a first segment of the actuator shaft and is configured to be coupled for co-rotation to a second segment of the actuator shaft rotatable in a second disconnect switch of a second loadbreak module.

9. The switchgear system of claim 8, wherein the first segment of the actuator shaft is configured to be coupled for co-rotation to the second segment of the actuator shaft by a key and keyway arrangement.

10. A switchgear system operable at voltages up to 27 kV, the switchgear system comprising:
an enclosure containing atmospheric air;
a loadbreak module disposed within the enclosure, the loadbreak module including
a loadbreak module housing made of a solid dielectric material,
a vacuum interrupter enclosed within the loadbreak module housing and having a fixed contact and a movable contact,
an interchange electrically connected to the movable contact,
a first terminal electrically connected to the interchange,
a second terminal electrically connected to the interchange, and
a third terminal electrically connected to the fixed contact,
wherein the vacuum interrupter is operable to selectively break or establish an electrical pathway between the interchange and the third terminal in response to movement of the movable contact relative to the fixed contact;
a bushing configured to be coupled to the enclosure, the bushing including a fourth terminal accessible from outside the enclosure; and
a disconnect switch configured to be electrically connected in series between the loadbreak module and the bushing, the disconnect switch including
a disconnect switch housing made of a solid dielectric material,
a blade rotatably coupled to the disconnect switch housing,
a first contact configured to be electrically connected to the fourth terminal, and
a second contact configured to be electrically connected to the third terminal,
wherein the blade is rotatable relative to the disconnect switch housing between a first position in which the blade is spaced from the first contact and the second contact such that the third terminal is electrically disconnected from the fourth terminal, and a second position in which the blade engages the first contact and the second contact to establish an electrical connection between the third terminal and the fourth terminal, and
wherein the bushing is configured to be selectively coupled to (i) the disconnect switch to electrically connect the fourth terminal to the first contact and (ii) the loadbreak module housing to electrically connect the fourth terminal to the third terminal.

11. The switchgear system of claim 10, wherein the bushing includes a first boss configured to be selectively received in (i) a first recess in the disconnect switch housing to electrically connect the fourth terminal and the first contact and (ii) a second recess in the loadbreak module housing to electrically connect the fourth terminal and the third terminal.

12. The switchgear system of claim 10, wherein the loadbreak module is a first loadbreak module, and wherein the switchgear system further comprises
a second loadbreak module; and
a bridge assembly configured to electrically connect the first terminal or the second terminal of the first loadbreak module to a terminal of the second loadbreak module.

13. The switchgear system of claim 12, wherein the loadbreak module housing of the first loadbreak module includes a first opening aligned with the first terminal and a second opening aligned with the second terminal, and wherein the bridge assembly is insertable into the first opening or the second opening.

14. The switchgear system of claim 13, wherein the movable contact is movable along a first axis, and the first opening and the second opening are coaxial along a second axis that is perpendicular to the first axis.

15. The switchgear system of claim 14, wherein the first opening and the second opening are positioned opposite one another.

16. A switchgear system operable at voltages up to 27 kV, the switchgear system comprising:
an enclosure containing atmospheric air; and
a plurality of identical switch assemblies disposed within the enclosure, wherein the plurality of identical switch assemblies is arranged in a plurality of rows, wherein each switch assembly is electrically connected to at least one other switch assembly of the plurality of identical switch assemblies, and
wherein each switch assembly of the plurality of identical switch assembles includes
a loadbreak module including
a loadbreak module housing made of a solid dielectric material,
a vacuum interrupter enclosed within the loadbreak module housing and having a fixed contact and a movable contact,
an interchange electrically connected to the movable contact,
a first terminal electrically connected to the interchange,
a first opening aligned with the first terminal,
a second terminal electrically connected to the interchange,
a second opening aligned with the second terminal, and
a third terminal electrically connected to the fixed contact,
wherein the vacuum interrupter is operable to selectively break or establish an electrical pathway between the interchange and the third terminal in response to movement of the movable contact relative to the fixed contact, and a bushing configured to be coupled to the enclosure, the bushing including a fourth terminal accessible from outside the enclosure, wherein the bushing is configured to be coupled to the loadbreak module housing to electrically connect the fourth terminal to the third terminal; and a plurality of bridge assemblies, each bridge assembly configured to electrically connect the first terminal or the second terminal of a switch assembly of the plurality of identical switch assemblies to a first terminal or a second terminal of another switch assembly of the plurality of identical switch assemblies, wherein each bridge assembly of the plurality of bridge assemblies is configured to be selectively received in the first opening or the second opening of each switch assembly of the plurality of identical switch assemblies.

17. The switchgear system of claim 16, wherein each switch assembly of the plurality of identical switch asssemblies further comprises a disconnect switch configured to be electrically connected in series between the loadbreak module and the bushing, the disconnect switch including
a disconnect switch housing made of a solid dielectric material,
a blade rotatably coupled to the disconnect switch housing,
a first contact configured to be electrically connected to the fourth terminal, and
a second contact configured to be electrically connected to the third terminal,
wherein the blade is rotatable relative to the disconnect switch housing between a first position in which the blade is spaced from the first contact and the second contact such that the third terminal is electrically disconnected from the fourth terminal, and a second position in which the blade engages the first contact and the second contact to establish an electrical connection between the third terminal and the fourth terminal.

18. The switchgear system of claim 17, wherein the bushing is configured to be selectively coupled to (i) the disconnect switch to electrically connect the fourth terminal to the first contact and (ii) the loadbreak module housing to electrically connect the fourth terminal to the third terminal.

19. The switchgear system of claim 17, wherein the disconnect switch housing includes a window, and wherein an end of the blade extends through the window when the blade is in the first position.

20. The switchgear system of claim 16, wherein each of the first terminal and the second terminal of the loadbreak module of each switch assembly of the plurality of identical switch assemblies includes a post, wherein each bridge assembly of the plurality of bridge assemblies includes a conductive rod having a recess configured to slidably receive the post and a resilient contact band disposed within the recess, and wherein insertion of the post into the recess is configured to resiliently expand the contact band.

* * * * *